(12) United States Patent
Percebon et al.

(10) Patent No.: US 9,923,406 B2
(45) Date of Patent: Mar. 20, 2018

(54) SYSTEM AND METHOD FOR REDUCING LEAKAGE FLUX IN WIRELESS CHARGING SYSTEMS

(71) Applicant: QUALCOMM Incorporated, San Diego, CA (US)

(72) Inventors: Leandro Percebon, Munich (DE); Michael Werner, Markt Schwaben (DE); Daniel Kuerschner, Grasbrunn (DE); Wojciech Chlebosz, Taufkirchen (DE)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 14/846,394

(22) Filed: Sep. 4, 2015

(65) Prior Publication Data

US 2017/0070075 A1    Mar. 9, 2017

(51) Int. Cl.
*H02J 7/00* (2006.01)
*H02J 7/02* (2016.01)
*B60L 11/18* (2006.01)
*H02J 7/04* (2006.01)
(Continued)

(52) U.S. Cl.
CPC ............. *H02J 7/025* (2013.01); *B60L 11/182* (2013.01); *H02J 7/042* (2013.01); *H02J 50/70* (2016.02); *H02J 5/005* (2013.01)

(58) Field of Classification Search
CPC .. H02J 7/025; H02J 5/005; H02J 17/00; H02J 50/10; H02J 50/70; H02J 7/0027; H02J 50/50; B60L 11/182; B60L 2270/147; B60L 3/0046
See application file for complete search history.

(56) References Cited

U.S. PATENT DOCUMENTS

| 7,211,986 B1 | 5/2007 | Flowerdew et al. |
| 8,203,434 B2 * | 6/2012 | Yoshida ............. A61B 1/00029 340/10.34 |
| 9,071,061 B2 * | 6/2015 | Boys ....................... H02J 5/005 |

(Continued)

FOREIGN PATENT DOCUMENTS

| CN | 203942319 U | 11/2014 |
| JP | 2002152901 A | 5/2002 |

(Continued)

OTHER PUBLICATIONS

International Search Report and Written Opinion—PCT/US2015/048974—ISA/EPO—dated Apr. 13, 2016.

*Primary Examiner* — Helen Rossoshek
(74) *Attorney, Agent, or Firm* — Knobbe, Martens, Olson & Bear, LLP

(57) ABSTRACT

One innovation includes a system for reducing magnetic flux of a wireless charging field in a wireless power charging system. The system comprises a wireless power transmitter configured to generate the wireless charging field, the field comprising the magnetic flux and a collector comprising a ferromagnetic material and configured to reduce the magnetic flux. The collector is positioned between a first distance and a second distance at a third distance from the transmitter. The collector is configured to reduce the magnetic flux at a first level at the first distance, at a second level at the second distance, and at a third level at the third distance, the third level greater than each of the first and second levels.

31 Claims, 12 Drawing Sheets

(51) Int. Cl.
*H02J 50/70* (2016.01)
*H02J 5/00* (2016.01)

(56) References Cited

U.S. PATENT DOCUMENTS

| | | | | |
|---|---|---|---|---|
| 9,106,083 B2 * | 8/2015 | Partovi | | H02J 7/025 |
| 9,627,129 B2 * | 4/2017 | Abe | | H01F 38/14 |
| 2002/0041176 A1 * | 4/2002 | Eki | | H02J 7/025 |
| | | | | 320/109 |
| 2011/0181123 A1 | 7/2011 | Ichikawa | | |
| 2011/0181238 A1 * | 7/2011 | Soar | | B60N 2/24 |
| | | | | 320/108 |
| 2012/0146424 A1 * | 6/2012 | Urano | | H02J 5/005 |
| | | | | 307/104 |
| 2012/0242447 A1 | 9/2012 | Ichikawa | | |
| 2013/0015718 A1 * | 1/2013 | Jung | | H04B 5/0037 |
| | | | | 307/104 |
| 2013/0088090 A1 * | 4/2013 | Wu | | H01F 27/00 |
| | | | | 307/104 |
| 2013/0119928 A1 * | 5/2013 | Partovi | | H02J 7/025 |
| | | | | 320/108 |
| 2013/0181667 A1 * | 7/2013 | Takeshita | | B60L 11/182 |
| | | | | 320/108 |
| 2013/0257173 A1 * | 10/2013 | Saitoh | | H01F 38/14 |
| | | | | 307/104 |
| 2013/0257367 A1 | 10/2013 | Someya | | |
| 2013/0271069 A1 * | 10/2013 | Partovi | | H02J 7/025 |
| | | | | 320/108 |
| 2013/0306364 A1 | 11/2013 | Suzuki et al. | | |
| 2014/0008995 A1 | 1/2014 | Kanno | | |
| 2014/0042820 A1 | 2/2014 | Park et al. | | |
| 2014/0132210 A1 | 5/2014 | Partovi | | |
| 2014/0246958 A1 * | 9/2014 | Taniguchi | | H02K 21/14 |
| | | | | 310/68 B |
| 2014/0265621 A1 * | 9/2014 | Wong | | H02J 5/005 |
| | | | | 307/104 |
| 2014/0361634 A1 * | 12/2014 | Scholz | | H04B 5/0031 |
| | | | | 307/104 |
| 2015/0077053 A1 * | 3/2015 | Stamenic | | H02J 7/0042 |
| | | | | 320/109 |
| 2015/0162753 A1 * | 6/2015 | Werner | | H02J 5/005 |
| | | | | 307/104 |
| 2015/0200048 A1 * | 7/2015 | Han | | H01F 27/245 |
| | | | | 336/200 |
| 2015/0255993 A1 * | 9/2015 | Kuerschner | | H02J 5/005 |
| | | | | 307/104 |
| 2015/0260835 A1 * | 9/2015 | Widmer | | G01S 13/04 |
| | | | | 342/27 |
| 2015/0380157 A1 * | 12/2015 | Green | | B60L 11/182 |
| | | | | 307/104 |
| 2016/0068069 A1 * | 3/2016 | Percebon | | B60L 11/182 |
| | | | | 307/104 |
| 2016/0068070 A1 * | 3/2016 | Huang | | B60L 11/182 |
| | | | | 320/108 |
| 2016/0072296 A1 * | 3/2016 | Nejatali | | H02J 7/0044 |
| | | | | 307/104 |
| 2016/0144727 A1 * | 5/2016 | Tokura | | H01F 38/14 |
| | | | | 307/104 |
| 2016/0190814 A1 * | 6/2016 | Budhia | | H02J 5/005 |
| | | | | 307/104 |
| 2016/0303981 A1 * | 10/2016 | Neumann | | B60L 11/182 |

FOREIGN PATENT DOCUMENTS

| | | |
|---|---|---|
| KR | 20130072284 A | 7/2013 |
| KR | 20130098099 A | 9/2013 |
| WO | WO-2012102008 A1 | 8/2012 |
| WO | WO-2013107920 A1 | 7/2013 |
| WO | WO-2014122121 A1 | 8/2014 |
| WO | WO-2014132115 A2 | 9/2014 |

* cited by examiner

SYSTEM AND METHOD FOR REDUCING LEAKAGE FLUX IN WIRELESS CHARGING SYSTEMS

TECHNOLOGICAL FIELD

The present disclosure relates generally to wireless power transfer. More specifically, this disclosure relates to devices, systems, and methods of optimizing wireless power transfer to remote systems such as vehicles including batteries in inductive power transfer systems.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless Electric Vehicle Charging (WEVC) systems that are capable of transferring power in free space (e.g., via a wireless charging field) to be used to charge electric vehicles may overcome some of the deficiencies of wired charging solutions. As such, wireless charging systems and methods that efficiently and safely transfer power for charging electric vehicles are desirable.

SUMMARY

The implementations disclosed herein each have several innovative aspects, no single one of which is solely responsible for the desirable attributes of the invention. Without limiting the scope, as expressed by the claims that follow, the more prominent features will be briefly disclosed here. After considering this discussion, one will understand how the features of the various implementations provide several advantages over current wireless charging systems.

One innovative aspect of the subject matter described in this disclosure can be implemented in a system for reducing magnetic flux of a wireless charging field in a wireless power charging system. The system comprises a wireless power transmitter configured to generate the wireless charging field, the field comprising the magnetic flux and a collector comprising a ferromagnetic material and configured to reduce the magnetic flux. The collector is positioned between a first distance and a second distance at a third distance from the transmitter. The collector is configured to reduce the magnetic flux at a first level at the first distance, at a second level at the second distance, and at a third level at the third distance, the third level greater than each of the first and second levels.

Another innovative aspect of the subject matter described in this disclosure can be implemented in a method of reducing magnetic flux of a wireless charging field in a wireless power charging system. The method comprises generating, via a wireless power transmitter, the wireless charging field, the field comprising the magnetic flux. The method further comprises reducing the magnetic flux via a collector comprising a ferromagnetic material. The collector is positioned between a first distance and a second distance at a third distance from the transmitter, where a magnetic flux reduction of a first level at the first distance and a magnetic flux reduction of a second level at the second distance are less than or equal to a magnetic flux reduction at a third level at the third distance.

Another innovative aspect of the subject matter described in this disclosure can be implemented in an apparatus for reducing magnetic flux of a wireless charging field in a wireless power charging system. The apparatus comprises means for generating the wireless charging field, the field comprising the magnetic flux and means for reducing the magnetic flux, comprising a ferromagnetic material. The reducing means is positioned between a first distance and a second distance at a third distance from the generating means. The reducing means is configured to reduce the magnetic flux at a first level at the first distance, at a second level at the second distance, and at a third level at the third distance, the third level greater than each of the first and second levels.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

Figure 1:
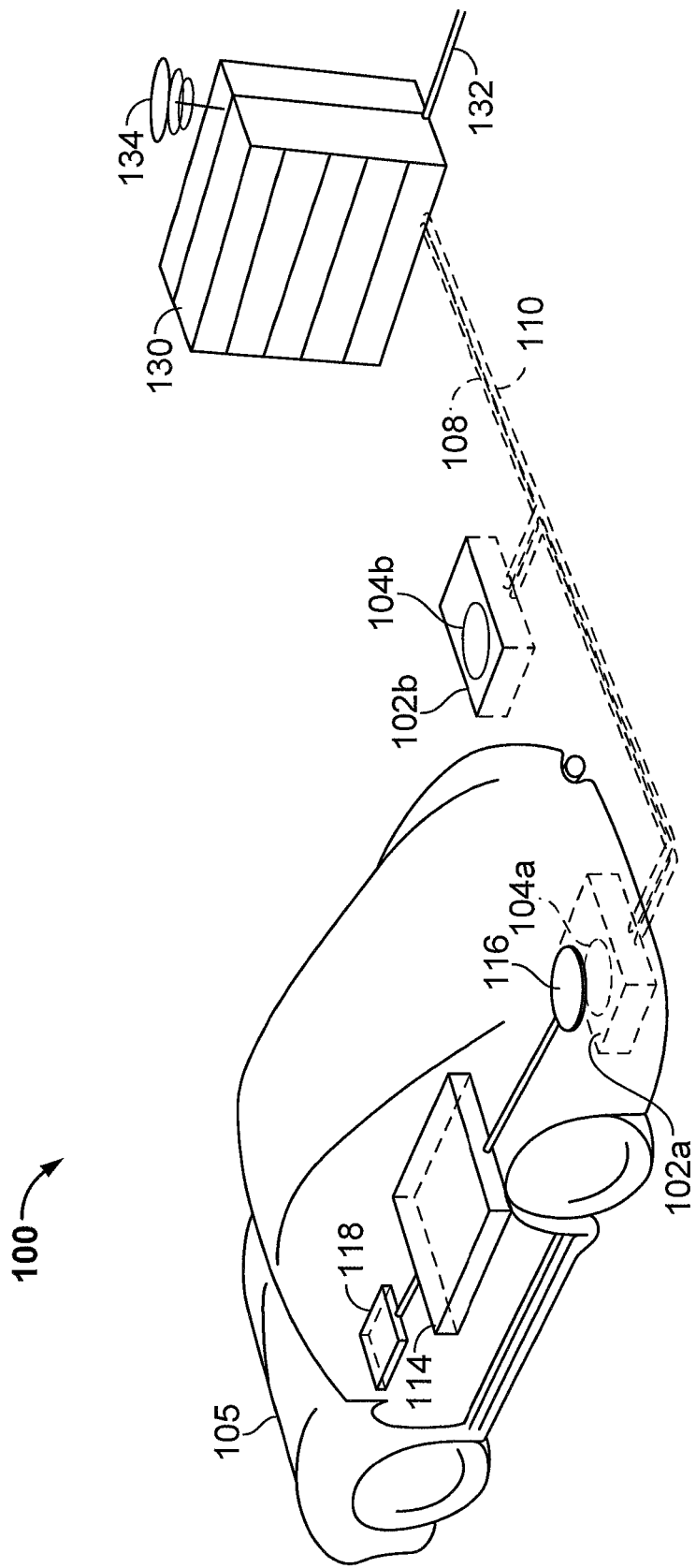
FIG. 1 is a diagram of an exemplary wireless power charging system for charging an electric vehicle, in accordance with an exemplary implementation.

The detailed description set forth below in connection with the appended drawings is intended as a description of exemplary implementations and is not intended to represent the only implementations which may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form.

The teachings of this disclosure may be embodied in many different forms and should not be construed as limited to any specific structure or function presented throughout this disclosure. Rather, these aspects are provided so that this disclosure will be thorough and complete, and will fully convey the scope of the disclosure. The scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless power transfer technologies and system configurations, some of which are illustrated by way of example in the figures and in the following description of the preferred aspects. The detailed description and drawings are merely illustrative of the disclosure rather than limiting, the scope of the disclosure being defined by the appended claims and equivalents thereof.

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

The terminology used herein is for the purpose of describing particular implementations only and is not intended to be limiting of the disclosure. It will be understood that if a specific number of a claim element is intended, such intent will be explicitly recited in the claim, and in the absence of such recitation, no such intent is present. For example, as used herein, the singular forms "a", "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Wirelessly transferring power may refer to transferring any form of energy via wireless fields, such as electric fields, magnetic fields, electromagnetic fields, wireless charging fields, or otherwise from a transmitter having a "transmitting coil" or "transmitting coupler" to a receiver without the use of physical electrical conductors (e.g., power may be transferred through free space). The power output into a wireless charging field may be received, captured by, or coupled by a "receiving coil" or "receiving coupler" to achieve power transfer.

FIG. 1 is a diagram of an exemplary wireless power charging system 100 for charging an electric vehicle 105, in accordance with an exemplary implementation. The wireless power charging system 100 enables charging of the electric vehicle 105 while the electric vehicle 105 is parked near a base wireless charging system 102a.

The electric vehicle 105 is used herein to describe a wireless power receiver. The electric vehicle 105 utilizes, as part of its locomotion capabilities, electrical power derived from a chargeable energy storage device (e.g., one or more rechargeable electrochemical cells or other type of battery). As non-limiting examples, some electric vehicles like the electric vehicle 105 may be hybrid electric vehicles that include, besides electric motors, a traditional combustion engine for direct locomotion or to charge the vehicle's battery. In an implementation, the electric vehicle 105 may draw all locomotion ability from electrical power. Accordingly, the electric vehicle 105 is not limited to an automobile, as shown, and may include motorcycles, carts, scooters, buses, and the like.

As shown, spaces for two electric vehicles 105 are illustrated in a parking area to be parked over corresponding base wireless charging systems 102a and 102b. Each of the base wireless charging systems 102a and 102b also includes a base coupler 104a and 104b, respectively, for wirelessly transferring power. In some other implementations (not shown in FIG. 1), base couplers 104a or 104b may be stand-alone physical units and are not packaged with the base wireless charging system 102a or 102b. In some implementations, a local distribution center 130 may be connected to a power backbone 132 and configured to provide an alternating current (AC) or a direct current (DC) supply through a power link 110 to the base wireless charging system 102a. The base couplers (or induction coils) 104a and 104b may wirelessly transfer or receive power. The electric vehicle 105 may include a battery unit 114, an electric vehicle charging coupler 116 (EV coupler) (or induction coil), and an electric vehicle wireless charging system 118. The EV coupler 116 may interact with the base coupler 104*a*, for example, via a region of a wireless charging field generated by the base coupler 104*a*. In certain implementations, the EV coupler 116 can be disposed within a volume of an electric vehicle charging coupler housing (not illustrated in FIG. 1).

In some exemplary implementations, the EV coupler 116 may receive power when the EV coupler 116 is located in the wireless charging field produced by the base coupler 104*a*. The wireless charging field corresponds to a region where energy output by the base coupler 104*a* may be captured by the EV coupler 116. For example, the energy output by the base coupler 104*a* may be at a level sufficient to charge or power the electric vehicle 105 when received by the EV coupler 116. In some implementations, the level of power transferred may be on the order of one or multiple kilowatts, although the disclosure herein contemplates higher or lower power levels based on the application intended. In some cases, the wireless charging field may correspond to the "near-field" of the base coupler 104*a*. The near-field may correspond to a region in which there are strong reactive fields resulting from the currents and charges in the base coupler 104*a* that do not radiate power away from the base coupler 104*a* (e.g., extending out into the far field). In some cases the near-field may correspond to a region that is within about $1/2\pi$ of the wavelength of the base coupler 104*a*.

Local distribution center 130 may be configured to communicate with external sources (e.g., a power grid) via a communication backhaul 134, and with the base wireless charging system 102*a* via a communication link 108. In some aspects communication link 108 may be a wireless or a wired communications link.

In some implementations the EV coupler 116 may be aligned with the base coupler 104*a* and, therefore, disposed within a near-field region simply by the driver positioning the electric vehicle 105 correctly relative to the base coupler 104*a*. In other implementations, a sensor circuit or a controller (described with respect to FIG. 2) may provide a driver with visual feedback, auditory feedback, or combinations thereof to indicate when the electric vehicle 105 is properly placed for wireless power charging. In some implementations, an autopilot system (not shown in this figure) may move the electric vehicle 105 back and forth as desired (e.g., in zig-zag movements) until an alignment error has reached a tolerable value. This function may be performed automatically and autonomously by the electric vehicle 105 without or with only minimal driver intervention. In some implementations, the EV coupler 116, the base coupler 104*a*, or a combination thereof may have functionality for displacing and moving the couplers 116 and 104*a* relative to each other to more accurately orient them in relation to each other and develop more efficient magnetic coupling therebetween.

The base wireless charging system 102*a* may be located in a variety of locations. As non-limiting examples, some suitable locations include a parking area at a home of the electric vehicle owner, parking areas reserved for electric vehicle wireless charging modeled after petroleum-based filling stations, and parking lots at other locations such as shopping centers and places of employment.

The wireless power charging system 100 as described with reference to FIG. 1 may also provide aesthetic advantages. For example, there may be no charge columns and cables that could create an obstacle for vehicles and/or pedestrians.

The wireless power transmit and receive capabilities may be configured to be reciprocal such that the base wireless charging system 102*a* transfers power to the electric vehicle 105 and the electric vehicle 105 transfers power to the base wireless charging system 102*a*, e.g., in times of energy shortfall. This capability may be useful to stabilize the power distribution grid by allowing electric vehicles 105 to contribute power to the overall distribution system in times of energy shortfall caused by over demand or shortfall in renewable energy production (e.g., wind or solar).

Figure 2:
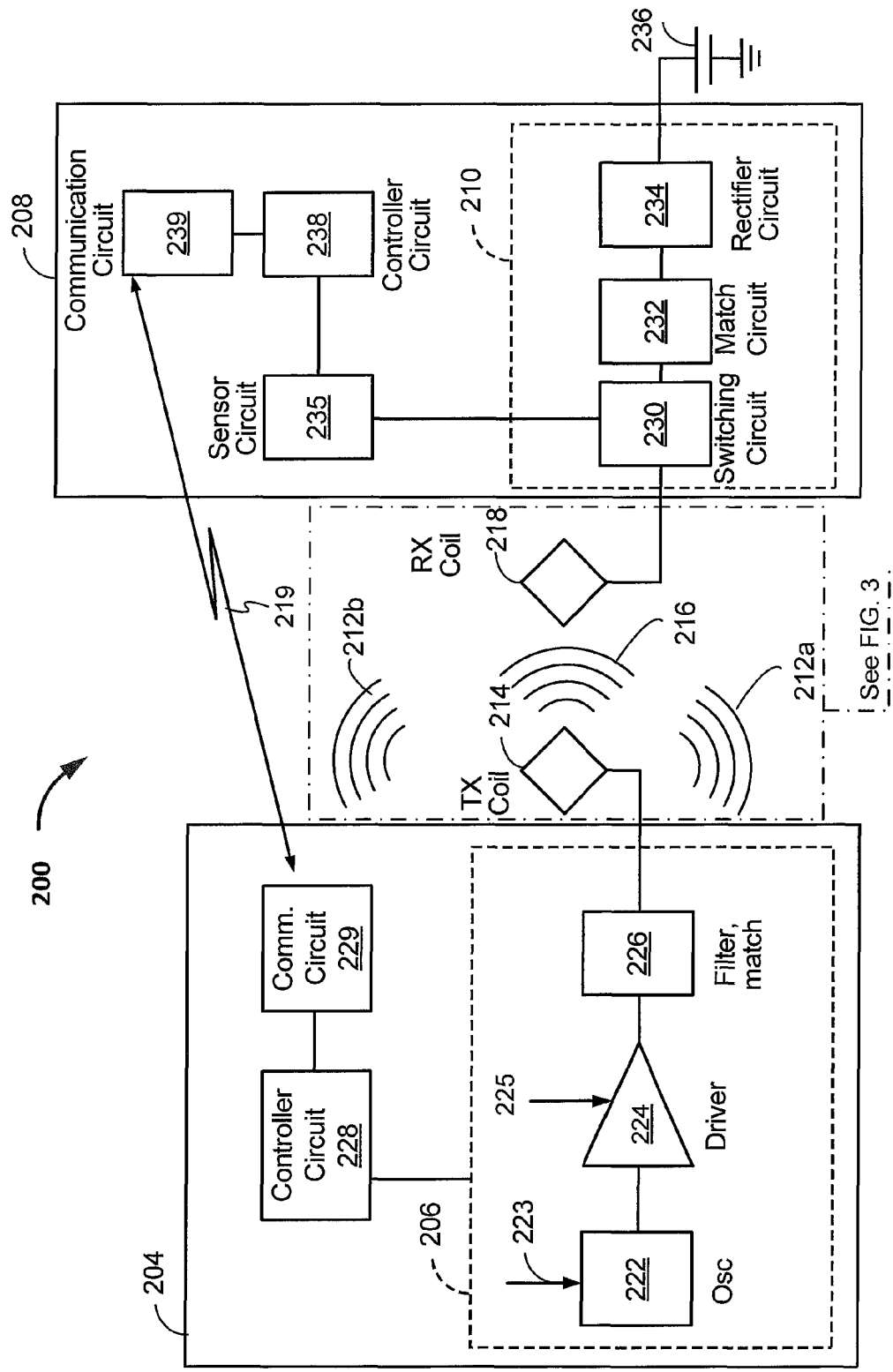
FIG. 2 is a functional block diagram of a wireless power charging system, in accordance with an exemplary implementation.

FIG. 2 is a functional block diagram of a wireless power charging system 200, in accordance with an exemplary implementation. The system 200 includes a transmitter 204 and a receiver 208. The transmitter 204 may perform substantially similar functions to the base wireless charging system 102*a*. The transmitter 204 may comprise a transmit coil 214 and a transmit circuitry 206, similar to the base coupler 104 and base wireless charging system 102 of FIG. 1. Further, the receiver 208 may perform substantially similar functions as the electric vehicle charging system 100 and the EV coupler 116 of FIG. 1.

As shown in FIG. 2, the transmitter 204 may include a communication circuit 229 electrically connected to a transmit circuitry 206 via a controller circuit 228. The transmit circuitry 206 may include an oscillator 222, operationally coupled to a driver circuit 224 and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit coil 214 at, for example, a resonant frequency of the transmit coil 214 based on an input voltage signal (VD) 225. In one non-limiting example, the driver circuit 224 may be a switching amplifier configured to receive a square wave from the oscillator 222 and output a sine wave.

The filter and matching circuit 226 may filter out harmonics or other unwanted frequencies and match the impedance of the transmitter 204 to the impedance of the transmit coil 214. As a result of driving the transmit coil 214, the transmit coil 214 may generate a wireless charging field 216 to wirelessly output power at a level sufficient for charging a battery 236 of an electric vehicle, for example.

The transmitter 204 may further include the controller circuit 228 electrically connected to the communication circuit 229 and the transmit circuitry 206. The communication circuit 229 may be configured to communicate with the communication circuit 239 within the receiver 208 over a communications link 219. Communications from the transmitter 204 to the receiver 208 via communications link 219 may comprise information regarding charging processes, including increased or decreased power capabilities of the transmitter 204 and other information associated with the charging capabilities of the transmitter 204 and/or the receiver 208. Unless stated otherwise, each component within the transmit circuitry 206 may have substantially the same functionality as the respective components within any complementary transmit circuitry within the base wireless charging system 102 as previously described in connection with FIG. 1.

The receiver 208 may comprise a receive coil 218 and a receive circuitry 210, similar to the EV coupler 116 and electric vehicle charging system 118 of FIG. 1. The receive circuitry 210 may include a switching circuit 230 operationally connected to a match circuit 232, and a rectifier circuit 234 operationally connected to the match circuit 232. The receive coil 218 may be electrically connected to the switching circuit 230. The switching circuit 230 may selectively connect the receive coil 218 to the match circuit 232 or short circuit terminals of the receive coil 218 together. The match circuit 232 may be electrically connected to the rectifier circuit 234. The rectifier circuit 234 may provide a DC current to a battery 236. Unless stated otherwise, each component within the receive circuitry 210 may have substantially the same functionality as the respective components within any complementary receive circuitry within electric vehicle charging system 100 as previously described in connection with FIG. 1.

The receiver 208 may further include a sensor circuit 235 configured to sense a short circuit current or an open circuit voltage of the receive coil 218. A controller circuit 238 may be electrically connected to, and receive sensor data from, the sensor circuit 235. A communication circuit 239 may be connected to the controller circuit 238. The communication circuit 239 may be configured to communicate with the communication circuit 229 within the transmitter 204 over the communications link 219, similar to those noted above. Such communications may serve to indicate to the transmitter 204 specific power demands of the receiver 208, charge state of the battery 236, or other information related to the power requirements of the receiver 208. The communications link 219 may be wireless, for example Bluetooth or Wi-Fi (e.g., out-of-band as compared to the wireless charging field). In some embodiments, the communication link 219 may be in-band (e.g., using modulation of characteristics of the wireless charging field) or a combination of one or more of out-of-band, or in-band communication.

To provide power from the transmitter 204 to the receiver 208, energy may be transmitted from the transmit coil 214 through the wireless charging field 216 to the receive coil 218. In some implementations, the transmit coil 214 and the transmit circuitry 206 form a resonant circuit having a particular resonant frequency. The receive coil 218 and the receive circuitry 210 form another resonant circuit having a particular resonant frequency. Because losses are minimized between two coupled resonant systems having the same resonant frequency, it is desirable for the resonant frequency associated with the receive coil 218 and the receive circuitry 210 to be substantially the same as the resonant frequency associated with the transmit coil 214 and the transmit circuitry 206. The resonant frequency of the resonant circuits may be based on the inductance and capacitance of the resonant circuits. Inductance in the resonant circuit may generally be the inductance created by the transmit coil 214 or the receive coil 218. Capacitance (e.g., a capacitor) may be electrically connected to the transmit coil 214 or the receive coil 218 to create a resonant structure at a desired frequency. For example, a capacitor may be added in series with the transmit coil 214 or the receive coil 218 or may be added in parallel with the transmit coil 214 or the receive coil 218. Thus, it is further desirable that a tuning topology for one or both of the transmit coil 214 and the receive coil 218 is not significantly affected by inductance or load changes. The implementations disclosed herein may incorporate resonant or non-resonant architectures.

In certain implementations, the controller circuit 238 may determine the maximum possible output current or voltage for any position of the receive coil 218 with respect to the transmit coil 214. The controller circuit 238 may make such a determination before supplying current to the battery 236. In another implementation, the controller circuit 238 may make such a determination during charging of the battery 236. Such an implementation may provide a safety mechanism to ensure charging current and/or voltage remain within safe limits during the charging cycle. In yet another implementation the controller circuit 238 may make such a determination while a driver is driving the vehicle 105 (FIG. 1) into a space for charging.

As noted above, a matched transmit coil 214 and receive coil 218 of the WEVC system 200 may minimize losses. However some loss remains in the form of leakage fields 212*a*, 212*b* (collectively "leakage fields" 212). The transfer of energy or power through the wireless charging field 216, or the flux generated by the transmit coil 214 does not typically travel in a straight line to the receive coil 218. Instead, the wireless charging field 216 lines may emanate in some or all directions, away from the transmit coil 214. The wireless charging field 216 lines may be affected by the composition of any surrounding structures (e.g., the ground or the bottom of the electric vehicle 105). Accordingly, not all of the transmitted power actually arrives at the receive coil 218. Some of the transmitted magnetic energy (flux) flows in sub-optimum directions, "leaking" out of the system, becoming "leakage flux," and thus creating the leakage fields 212. The leakage fields 212 may potentially have negative influence on surrounding electronics or create a safety hazard for people nearby. Accordingly, it may be advantageous to minimize or reduce the leakage field 212 surrounding the transmit coil 214 and the receive coil 218 that flows away from the transmit coil 214.

Figure 3:
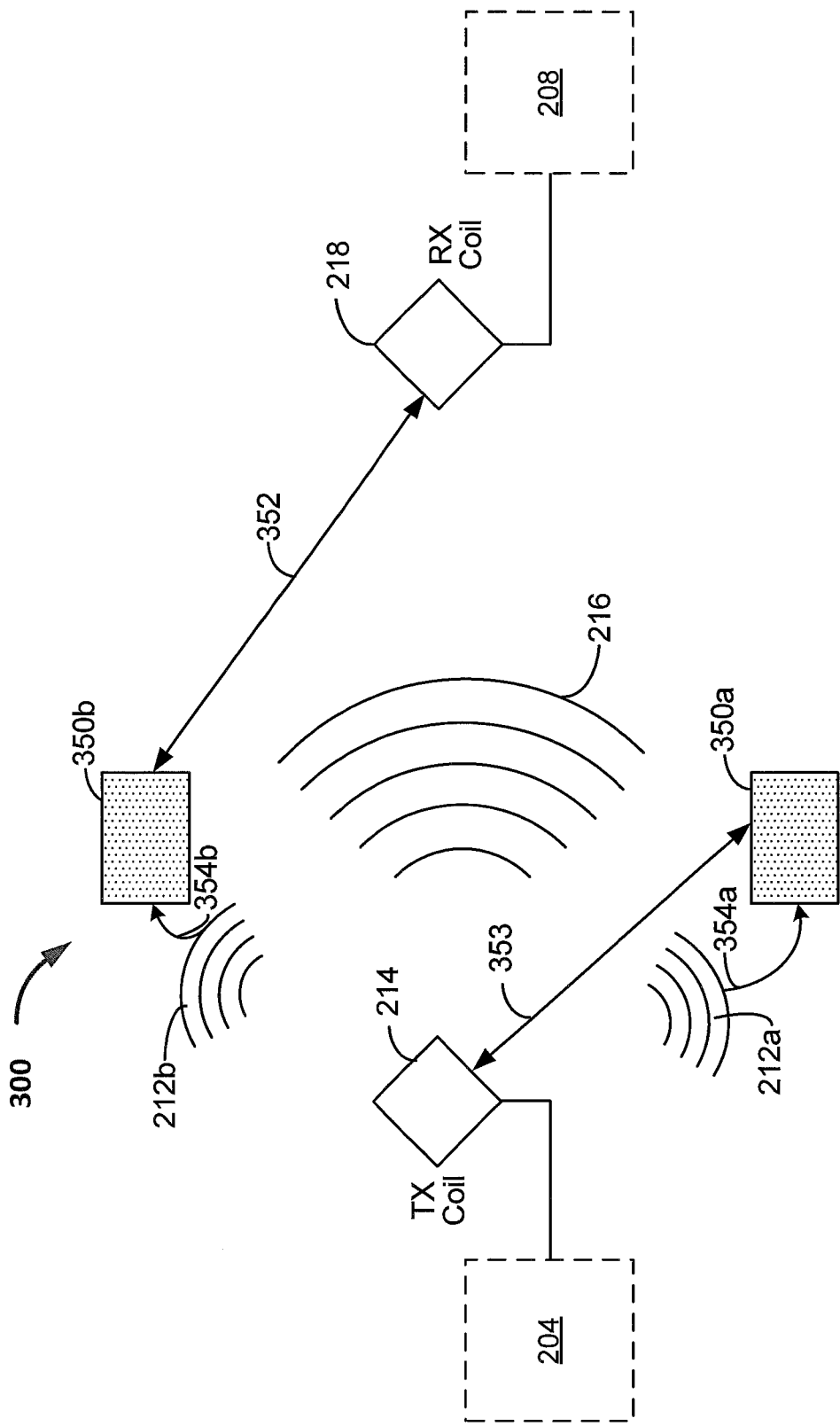
FIG. 3 is a functional block diagram of a wireless power charging system having collectors, in accordance with an exemplary implementation.

FIG. 3 is a functional block diagram of a wireless power charging system 300 having collectors 350*a*, 350*b*, in accordance with an exemplary implementation. A WEVC system 300 is shown having the transmit coil 214 and the receive coil 218 substantially similar to those shown in FIG. 2. As shown, the transmit coil 214 may transmit the wireless charging field 216 in the direction of the receive coil 218. The portions of the wireless charging field 216 received by the receive coil 218 may be converted into electrical power for the receiver 208 as described above, however not all of the energy of the wireless charging field 216 is actually received by the receive coil 218. The wireless charging field 216 energy (flux) that is not used to transfer power to the receive coil 218 may be referred to as the leakage field 212, shown flowing in less than optimum directions away from the transmit coil 214 toward the top and bottom of the page as the leakage field 212*a* and the leakage field 212*b*. As described above, this leakage flux may be detrimental to surrounding electronics or people.

In an implementation, one or more leakage field collectors 350*a* and 350*b* (collectively "collectors" 350) may be positioned to redirect and/or absorb the respective stray leakage fields 212*a*, 212*b*. The collectors 350 may be located at a distance 352 from the receive coil 218 or a distance 353 from the transmit coil 214. In some implementations, the collectors 350 may both be located with respect to the transmit coil 214, where both distances 352 and 353 are measured from the transmit coil 214. The collectors 350 may comprise ferrite or other ferromagnetic or ferromagnetic composites such as soft magnetic composites (SMC), nanocrystalline magnetic materials, or plastic bonded ferrite powder among other materials. Certain ferrous materials such as iron oxides, nickel compositions, among others may also be implemented. Composition, placement, and geometry of the collectors 350 may be selected to allow the collectors 350 to redirect and absorb the leakage fields 212. In another implementation, the collectors 350 may be further configured to oppose or negate the leakage fields 212. The ferrite or similar materials of the collectors 350 may be located at a distance from the transmit coil 214 and/or the receive coil 218 such that the collectors 350 provide minimal interference or have minimal or no effect on the transfer of power via the wireless charging field 216. The ferrite or similar materials of the collectors 350 may function differently than any ferrite materials of the transmitter 204 or the receiver 208. For example, ferrite materials of the transmitter 204 or the receiver 208 may direct guide, alter, shape, or enhance the wireless charging field 216 received by the receiver 208, while the ferrite materials of the collectors 350 may collect, redirect, or "absorb" the leakage field 212 to reduce field emissions on the electric vehicle 105 and the surroundings.

The WEVC system 300 may exhibit wireless fields (e.g. the wireless charging field 216, the leakage field 212) of varying strengths and patterns. Accordingly, selection and composition of the collectors 350 may depend on characteristics of a power transmitter and power receiver pair (e.g., the transmit coil 214 and the receive coil 218). In at least one implementation the collector 350 composition, geometry, and position may be based on a position and size of the transmit/receive coil pair. Such a basis may further include the magnitude and location of the leakage field 212 surrounding the electric vehicle 105 (FIG. 1).

In another implementation, selection of the collectors 350 may further consider the position of the collectors 350 in relation to the receive coil 218/transmit coil 214 or a height of the receive coil 218 above the ground (not shown in this figure) and/or above the transmit coil 214. In some implementations, the selection of the collectors 350 may further consider a depth of the transmit coil 214 below the ground or a depth of the receive coil 218 within the electric vehicle 105 (not shown in this figure).

In an implementation, the collectors 350 may be formed in one or more of a variety of possible geometries and placements, as discussed below. As shown in FIG. 3, the two collectors 350 are positioned within range of the wireless charging field 216, nearest to and flanking the transmit coil 214. In an implementation of the WEVC system 300, the receive coil 218 may be disposed on or in the bottom of an electric vehicle 105 (FIG. 1) similar to the EV coupler 116, while the transmit coil 214 may be disposed on or in the ground in a path of the electric vehicle 105, similar to base wireless charging systems 102a and 102 (FIG. 1). In some implementations, the collectors 350 may also be disposed in or on the ground below an area where the electric vehicle 105 may be positioned for wireless charging, in proximity to the transmit coil 214 (not shown in this figure).

In an implementation, the collectors 350 may comprise low-reluctance ferromagnetic materials having a predetermined geometry and composition selected to most effectively direct, capture, collect, or "absorb" the leakage field 212 to reduce field emissions on the electric vehicle 105 and the surroundings. As used herein, magnetic reluctance may be a scalar, expressed in terms of inverse henry ($H^{-1}$). In general, air and vacuum have high reluctance while easily magnetized materials such as iron and most ferrous materials may have low reluctance.

Reluctance may be considered to have an inverse relationship with magnetic permeability: $R=1/(\mu A)$, where R is the scalar representing reluctance; l is the length of the magnetic circuit in meters; $\mu$ is the permeability of the material (dimensionless); and A is the cross sectional area in meters. Thus low reluctance materials are also considered to have "high magnetic permeability."

As used herein, initial magnetic "permeability" generally refers to a measure of the ability of a material to support the formation of a magnetic field within itself (e.g., the collectors 350). Permeability is typically indicated by the constant, "$\mu$," or relative magnetic permeability, "$\mu_r$." As used herein, relative permeability, generally refers to the ratio of the permeability of a specific medium to the permeability of free space (a vacuum), $\mu_0$ ($\mu_r=\mu/\mu_0$). As a non-limiting example, ferrite may be said to have a relative magnetic permeability of $\mu_r=2000$; SMC: $\mu_r=500$; nanocrystalline magnetic material: $\mu_r=1000$; and plastic bonded ferrite powder: $\mu_r=30$. As a point of reference, iron (Fe) is commonly held to have a relative permeability of $\mu_r=5000$. Thus, the higher the permeability of a material, the greater its ability to support the formation of the magnetic field within itself. The foregoing examples are provided as reference, as the magnetic permeability of many ferrous/ferromagnetic/ferrimagnetic materials may vary greatly with magnetic field strength (H). For example, the relative permeability of any material in the presence of a sufficiently high field strength may trend toward one (1).

Considering the foregoing, the magnetic field causes magnetic flux to follow the path of least magnetic reluctance through a material having high relative permeability. Accordingly, the low reluctance characteristics of the collectors 350 may provide a path of least magnetic resistance for the leakage magnetic flux. Thus the collectors 350 may be used to influence the path of the magnetic flux, specifically the leakage fields 212, toward the collectors 350, thereby reducing magnetic field intensity in the vicinity of the receiver 208.

In an implementation, the low reluctance materials of the collectors 350 placed in proximity to the transmit coil 214 may attract magnetic flux, drawing the leakage field 212a in direction 354a and the leakage field 212b in direction 354b toward the collectors 350a and 350b, respectively, as opposed to an outward direction toward external systems and people. Accordingly, the collectors 350 may absorb and influence leakage magnetic flux, and may not oppose or cancel the leakage magnetic fields. In some implementations, the collectors 350 may be configured to absorb and influence leakage magnetic flux or may oppose or cancel the leakage fields 212.

Figure 4:
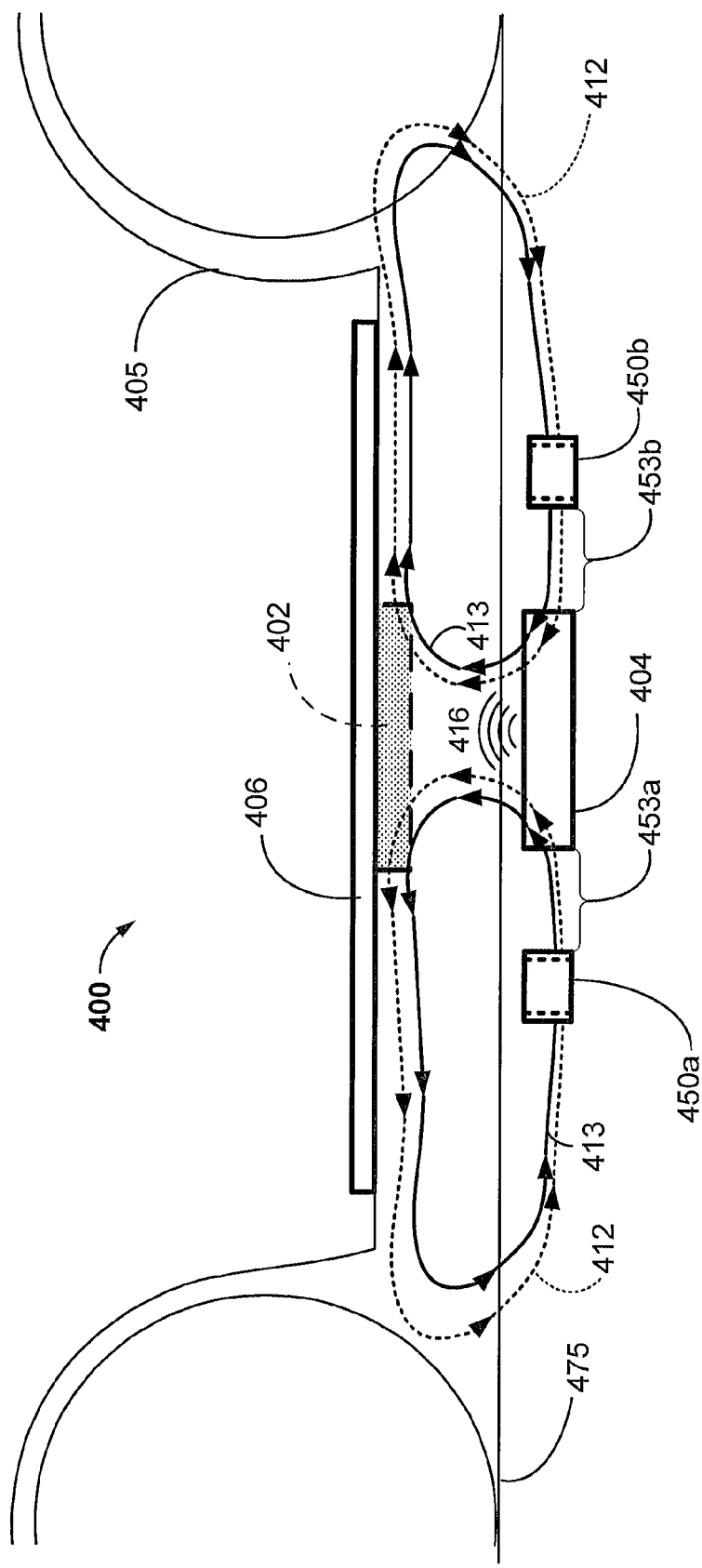
FIG. 4 shows a system for transferring power wirelessly and collecting a leakage field between a transmitter and an electric vehicle, in accordance with an exemplary implementation.

FIG. 4 shows a system 400 for transferring power wirelessly and collecting a leakage field between a transmitter 404 and an electric vehicle 405, in accordance with an exemplary implementation. As shown in FIG. 4, an electric vehicle 405, similar to the electric vehicle 105 (FIG. 1) receives wireless power via a WEVC system 400. The system 400 may be substantially similar to the system 100 (FIG. 1) and may supply the electric vehicle 405 with wireless power. The WEVC system 400 of the electric vehicle 405 may comprise a vehicle shield 406 disposed on the bottom of the electric vehicle 405. In an implementation, the vehicle shield 406 may cover an extensive portion of the underside of the electric vehicle 405 and may comprise a structural portion of the electric vehicle 405. In certain implementations where the vehicle shield 406 comprises a structural portion of the electric vehicle 405, a separate vehicle shield 406 may not be present. Accordingly, the presence of a specific component referred to as the "vehicle shield 406" in FIG. 4 may not be present in some implementations. The vehicle shield 406 and other subsequent implementations may, in certain implementations, be illustrative of the magnetic shielding characteristics of the electric vehicle 405 itself or the chassis. The vehicle shield 406 may also be referred to as a magnetic vehicle shield 406.

The vehicle shield 406 may comprise electromagnetic shielding materials or components. As a non-limiting example, such shielding materials may include certain metallic meshes or solid metal materials configured to negate any incident magnetic energy or otherwise block or prevent such magnetic energy from entering the passenger compartment of the electric vehicle 405. The vehicle shield 406 may serve to magnetically shield the interior of the electric vehicle 405 from the wireless charging field 416 (similar to the wireless charging field 216 of FIG. 2) while not interfering with the functions of the wireless power receiver (not shown in this figure) within a housing 402.

The electric vehicle 405 may further comprise the housing 402. As shown, the housing 402 may be disposed or otherwise connected to the bottom of the vehicle shield 406. As shown, the housing 402 is located approximately midway between the front and rear wheels. In an implementation, the housing 402 may be located anywhere on a bottom of the electric vehicle 405 mounted to the vehicle shield 406. In some implementations, it may be useful for the housing 402 to be integrated flush (not shown in this figure) with the lower surface of the electric vehicle 405 and the vehicle shield 406 so that there are no protrusive parts and so that a specified ground-to-vehicle body clearance may be maintained.

In some implementations the housing 402 may contain at least wireless vehicle charging components, such as wireless power receiver (e.g., the receiver 208 of FIG. 2), and a receiver coil (e.g., the receiver coil 218). The housing 402 may contain all of the components (as described in FIG. 2 above) needed to couple with and receive wireless power from a wireless power transmitter 404 (similar to the transmitter 204 of FIG. 2).

The electric vehicle 405 is positioned over the transmitter 404. The transmitter 404 is shown emitting the wireless charging field 416. The housing 402 may receive wireless power from the wireless charging field 416 as shown. The wireless charging field 416 is shown in this figure as a series of continuous arrows flowing from the wireless power transmitter 404 to the housing 402. The continuous arrows may be generally representative of the circular or continuous flow of magnetic flux within a magnetic field.

As shown, a portion of the wireless charging field 416 is shown flowing away from the housing 402. While the majority of the continuous arrows comprising the wireless charging field 416 are shown in the vicinity of the housing 402, a portion of the arrows are also flowing horizontally away from the power transmitter 404 to the left and right of FIG. 4, representing the front and rear of the vehicle 405. The portion of arrows flowing in sub-optimal directions or away from the housing 402 represent the leakage field 412, similar to the leakage field 212 shown in FIG. 2. As noted previously with respect to FIG. 2, the leakage field 412 may have negative effects on nearby electronics or possibly present a hazard to people. While not directly represented in this figure, the leakage field 412 also flows to the left and right of the electric vehicle 405, that is, in and out of the page.

The WEVC system 400 may further comprise one or more leakage field collectors 450a and 450b (collectively known as "collectors" 450). The collectors 450 may be structurally and operably similar to the collectors 350 (FIG. 3) and may serve to absorb, cancel, or redirect the leakage field 412. The leakage field collector 450 is shown positioned in proximity to the transmitter 404, embedded within the ground 475 surrounding the transmitter 404. The transmitter 404 indicates its position in relation to the collectors 450 and within the ground 475.

In some implementations, the collector 450 may protrude upward from the ground 475 such that it extends above the surface of the ground 475, wherein the top surface of the collector 450 is elevated above the top surface of the transmitter 404. As noted above, the housing 402 may be integrated into the surface of the ground 475 such that it is flush with the top surface of the ground 475. However, in some implementations, the collector 450 may not protrude from the ground 475 more than the transmitter 404 or may protrude from the ground 475 less than the transmitter 404. Accordingly, in some implementations, the upper portion of the transmitter 404 may protrude from the ground 475 further than the collector 450 (the protrusion not shown in this figure).

In some implementations, the collector 450 may offer a manner to reduce the leakage field 412 (corresponding to the leakage field 212 of FIG. 2) by providing a low-reluctance path for the leakage field 412. As shown in FIG. 4, the continuous lines corresponding to a reduced leakage field 413 and indicate the path of the reduced leakage field 413 as influenced by the collector 450. As shown, the continuous lines correspond to the reduced leakage field 413, which is shown as having a smaller size due to influence by the collectors 450 as compared to the leakage field 412 without the collectors 450. The leakage field 412 without the influence of the collectors 450 is indicated by the dashed line, having a larger size than the reduced leakage field 413. The size of the leakage field 412 and the reduced leakage field 413 may correspond to the area or region within which the leakage field may be detected. Thus, the smaller the area or region, the less the leakage field emanates into space and the less undesired exposure may occur. The field lines of leakage field 413 may be induced to flow toward the collector 450 due to presence of the low-reluctance qualities of the collector 450.

The collectors 450 and the transmitter 404 are shown with distances 453a and 453b (collectively "distance" 453) therebetween. As shown, the collector 450a is spaced the distance 453a from the transmitter 404, while the collector 450b is spaced the distance 453b from the transmitter 404. In some implementations, the collectors 450a and 450b are equally spaced (distances 453a and 453b are the same) from the transmitter 404, though they need not be spaced as such. The collectors 450 may be spaced at distances 453a and 453b from the transmitter 404 that maximize the reduction of the leakage field by the collectors 450. In some implementations, the locations of the collectors 450 and the transmitter 404 may be varied in relation to the vehicle shield 406 (for example, center of the vehicle shield 406, front of the vehicle shield 406, etc.). The locations of the collectors 450 and the transmitter 404 may also be varied based on a type of transmitter coil in the transmitter 404. The variation of the locations of the collectors 450 and the transmitter 404 may impact the distances 453a and 453b.

Figure 5:
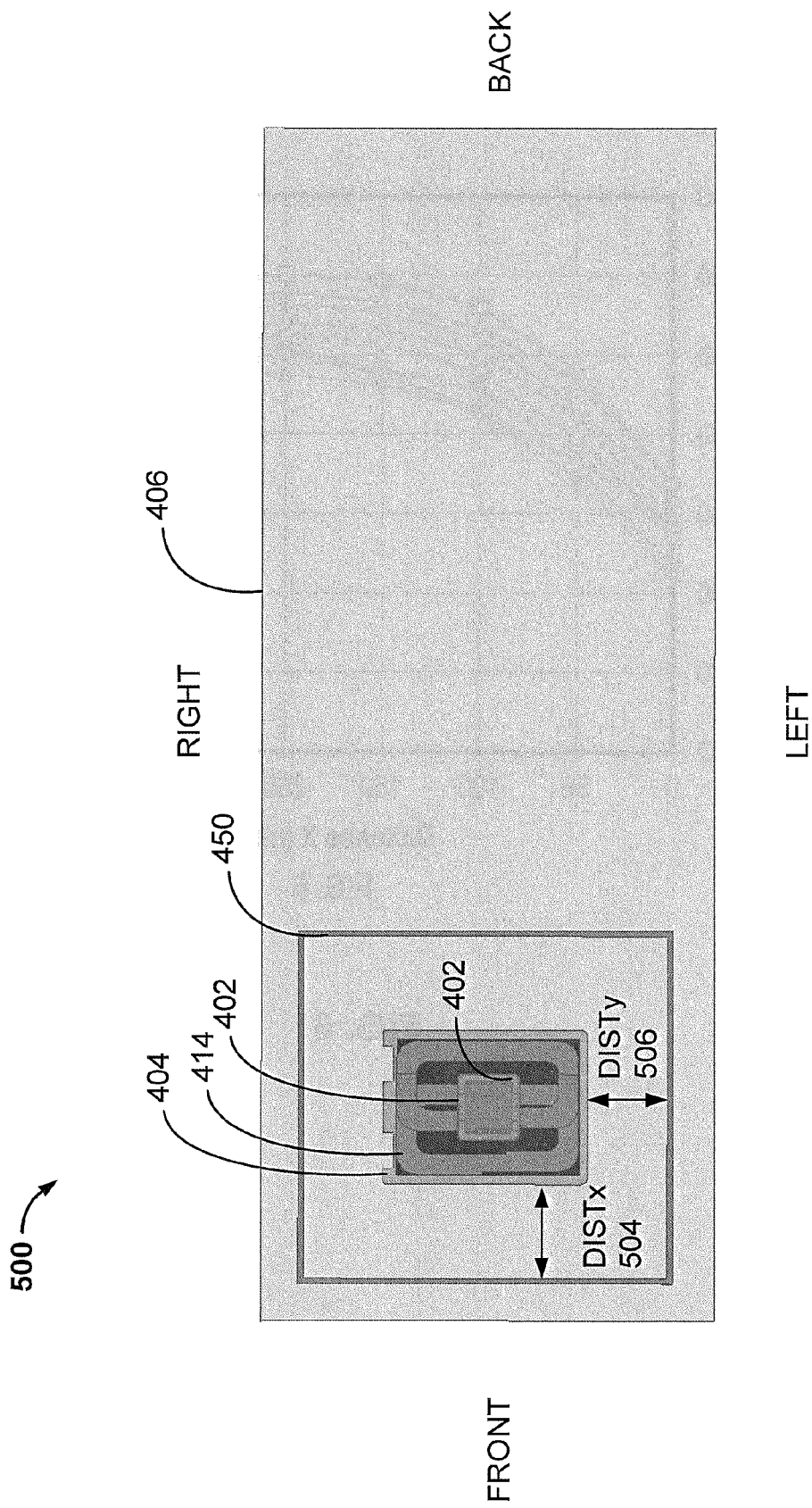
FIG. 5 shows a top-down view of the system for transferring power wirelessly and collecting the leakage field shown in FIG. 4.

FIG. 5 illustrates a top-down view of the wireless power charging system 400 shown in FIG. 4. The FIG. 5 shows a WEVC system 500 including the collectors 450 as described above in relation to FIG. 4, the transmitter 404 (FIG. 4), comprising the transmit coil 414, the receive coil in the housing 402 (FIG. 4), and the vehicle shield 406 (FIG. 4). As shown in FIG. 5, the receive coil in the housing 402 mounts closer to the front of the vehicle shield 406 (corresponding to the front of the electric vehicle 405) and in the center of the vehicle shield 406. In some implementations, the receive coil in the housing 402 may mount in any other position on the vehicle shield 406 (for example, at the center of the vehicle shield 406, at the back of the vehicle shield 406, or on either the right or left side of the vehicle shield 406). Additionally, the collector 450 is a rectangle around the transmitter 404, where the transmitter 404 is centered within the rectangle of the collector 450. In some implementations, the transmitter 404 may not be centered within the rectangle of the collector 450 or may not be symmetrically disposed in relation to the transmitter 404. In some implementations, as will be described below, the collector 450 may comprise a different shape around the transmitter 404, may only partially surround the transmitter 404, or may be located in proximity to the transmitter 404 and run parallel or perpendicular to at least a portion of the transmitter 404.

The WEVC system 500 as shown also includes a distance $dist_x$ 504, and a distance $dist_y$ 506. The $dist_x$ 504 represents the distance between the transmitter 404 and the collector 450 in the x-axis of FIG. 5. The $dist_x$ 504 corresponds with the distances 453 discussed above in relation to FIG. 4. Similarly, the $dist_y$ 506 represents the distance between the transmitter 404 and the collector 450 in the y-axis of FIG. 5. When the transmitter 404 is centered within the collector 450, the $dist_y$ 506 may be the same for all parallel points between the transmitter 404 and the collector 450 in the x-axis, while the $dist_x$ 504 may be the same for all parallel points in the y-axis. The x-axis of the FIG. 5 may correspond to a distance along a length of the electric vehicle 405. The y-axis of the FIG. 5 may correspond to a distance along a width of the electric vehicle 405.

As described above in relation to FIG. 4, the $dist_x$ 504 and $dist_y$ 506 may influence the reduction of the leakage field by the collectors 450. For example, moving the collectors 450 further from the transmitter 404 along the length of the electric vehicle 405 may increase or decrease the reduction of the leakage field by the collectors 450 as compared to when the collectors 450 are positioned directly above the transmitter 404. The collectors 450 may comprise a ferromagnetic material and may reduce the leakage magnetic flux 412 (FIG. 4). The distance 453 at which the collectors 450 and the transmitter 404 are spaced may define a percentage of leakage magnetic flux, reduced by the collectors 450. This percentage of leakage magnetic flux may be maximized at a first level when the distance 453 is at an optimum distance between a first distance and a second distance, the distance 453 being greater than the first distance and less than the second distance. Furthermore, the collector 450 may have a volume above which an increase in the volume of the collector 450 has minimal effect on the reduction of leakage magnetic flux 412. Below this volume, the reduction of the leakage magnetic flux substantially increases the reduction of the leakage magnetic flux. Variations will be discussed in further detail below.

Figure 6:
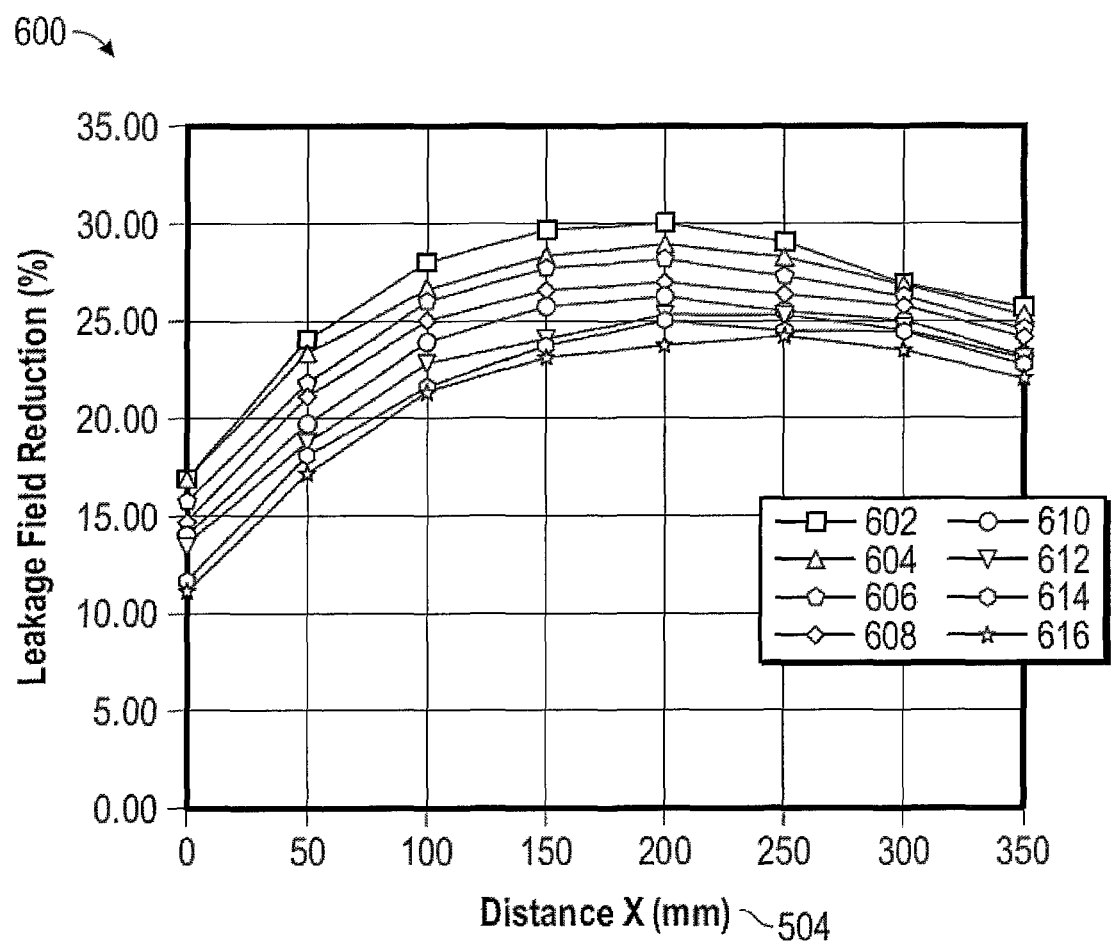
FIG. 6 shows a graph of a leakage field reduction by the collectors in relation to a distance between the collectors and the transmitter along a length direction of the electric vehicle.

FIG. 6 shows a graph 600 of a leakage field reduction by the collectors 450 in relation to a distance between the collectors 450 and the transmitter 404 along a length direction of the electric vehicle 405. The graph 600 shows the $dist_x$ 504 (FIG. 5) along an x-axis of the graph 600 and a percentage of reduction of the leakage field along a y-axis of the graph 600. As described above, the x-axis represents the distance between the transmitter 404 and the collector 450 (FIG. 5), in millimeters. The y-axis represents the percentage of the leakage field reduced as compared to the leakage field without use of the collector 450. The values and curves shown in graph 600 are examples of the percentage of reduction of the leakage field at various distances between the collectors 450 and the transmitter 404. These examples are generally for purposes of illustration and are not meant to be limiting.

The graph 600 shows eight (8) curves (lines 602-616) corresponding to different $dist_y$ 506 (FIG. 5) values. The eight distances represented for $dist_y$ 506 are 0 mm (line 602), 50 mm (line 604), 100 mm (line 606), 150 mm (line 608), 200 mm (line 610), 250 mm (line 612), 300 mm (line 614), and 350 mm (line 616). For example, each line 602-616 indicates a different positioning of the collector 450 in relation to the transmitter 404, measured as a displacement between the centers of the collector 450 and the transmitter 404. Accordingly, the line 602 indicates that in the WEVC system 500, locating the collector 450 at a $dist_y$ 506 of 0 mm and a $dist_x$ 504 of 0 mm from the transmitter 404 reduces the leakage field approximately 17% as compared to no collector 450 existing in the WEVC system 500. The distances $dist_x$ 504 and $dist_y$ 506 represent the distances between an edge of the transmitter 404 nearest the collector 450 and an edge of the collector 450 nearest the transmitter 404, as shown by distances 453a and 453b in FIG. 4. The line 602 indicates an increased reduction of the leakage field as the $dist_x$ 504 increases, to a peak reduction of the leakage field of approximately 30% at the $dist_x$ 504 of 200 mm. At this point, the reduction of the leakage field begins decreasing as the $dist_x$ 504 continues to increase (for example, at a $dist_x$ 504 of 250 mm, line 602 indicates the reduction of the leakage field is 29% and at 350 mm is 26%). Similarly, each of the other lines 604-616 indicate the same increase in reduction to a particular maximum value at a given $dist_x$ 504 before decreasing in reduction of the leakage field as the $dist_x$ 504 continues to increase. As depicted, line 604 begins at a reduction of 16%, has a maximum reduction of 29% at 200 mm in at the $dist_x$ 504, and reduces to 25% at $dist_x$ 504 of 350 mm. As depicted, line 606 begins at a reduction of 15.5%, has a maximum reduction of 28.5% at 200 mm in at the $dist_x$ 504, and reduces to 24.5% at $dist_x$ 504 of 350 mm.

As depicted, line 606 begins at a reduction of 16%, has a maximum reduction of 28% at 200 mm in the $dist_x$ 504, and reduces to 24.5% at $dist_x$ 504 of 350 mm. As depicted, line 608 begins at a reduction of 15%, has a maximum reduction of 26.5% at 200 mm in the $dist_x$ 504, and reduces to 24.5% at $dist_x$ 504 of 350 mm. As depicted, line 610 begins at a reduction of 14.5%, has a maximum reduction of 26% at 200 mm in the $dist_x$ 504, and reduces to 23% at $dist_x$ 504 of 350 mm. As depicted, line 612 begins at a reduction of 13.5%, has a maximum reduction of 25.5% at 250 mm in the $dist_x$ 504, and reduces to 23% at $dist_x$ 504 of 350 mm. As depicted, line 614 begins at a reduction of 12%, has a maximum reduction of 25% at 200 mm in the $dist_x$ 504, and reduces to 12.5% at $dist_x$ 504 of 350 mm. As depicted, line 616 begins at a reduction of 11.5%, has a maximum reduction of 24% at 250 mm in the $dist_x$ 504, and reduces to 22% at $dist_x$ 504 of 350 mm.

Thus, the graph 600 indicates that for all distances or offsets of the collector 450 and the transmitter 404 along the y-axis, while the $dist_x$ 504 is increasing, there is a distance along the x-axis at which the reduction of the leakage field 413 by the collector 450 is maximized. After this distance at which the reduction of the leakage field is maximized, the reduction of the leakage field by the collector 450 reduces as the $dist_x$ 504 continues to increase. Accordingly, there is a distance (along the length of the electric vehicle 405) from the transmitter 404 at which the collector 450 is most effective. Beyond this distance, the collector 450 becomes less effective at reducing the leakage field. Similarly, below this distance, the collector 450 is also less effective at reducing the leakage field. Additionally, this relationship between the distance corresponding to the reduction of the leakage field is shown to apply regardless of the location of the collector 450 in relation to the transmitter 404 along the y-axis. Additionally, or alternatively, a horizontal offset between the housing 402 and the transmitter 404 or variations between the type of transmitter 404 (for example a bipolar transmitter) or the type of receiver within the housing 402 (for example a DD receiver) may also affect the reduction of the leakage field by the collector 450.

For example, for line 602 described above, the maximum percentage of the reduction of the leakage field occurs at or near 200 mm along the x-axis (when the $dist_x$ 504 between the transmitter 404 and the collector 450 along the length of the car is 200 mm). This maximum reduction of the leakage field (approximately 30%) is a peak reduction of the leakage field that occurs between two reduction values of the leakage field as indicated in FIG. 6. These two reduction values between which the maximum reduction lies may exist at 150 mm (reduction value of approximately 29.5%) and 250 mm (reduction value of approximately 29%). At distances less than 150 mm and greater than 250 mm, the reduction of the leakage field reduction is less than at the maximum reduction at $dist_x$ 200 mm.

Figure 7A:
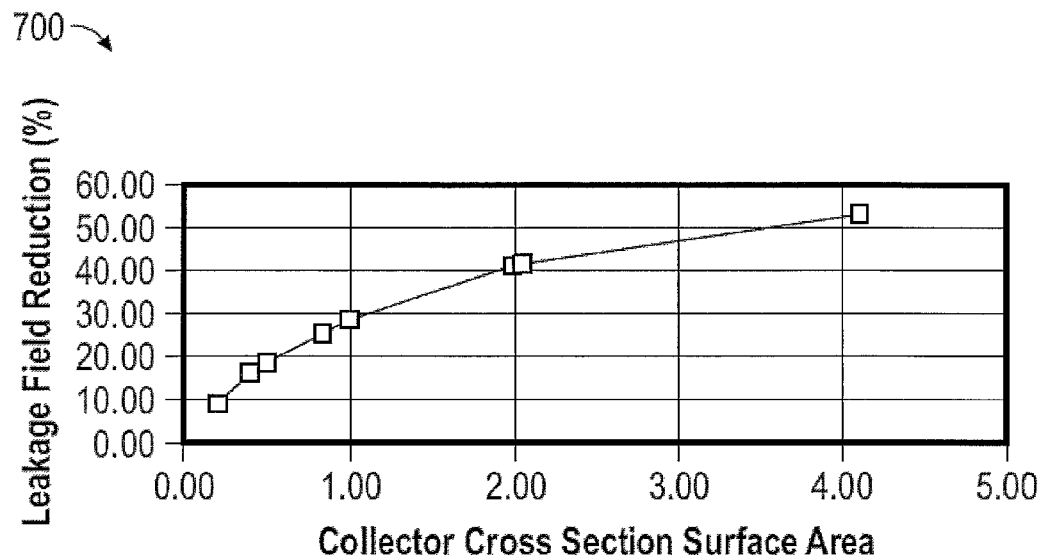
FIG. 7A shows a graph of the leakage field reduction as a function of a surface area of a cross section of the collectors.

FIG. 7A shows a graph 700 of the leakage field reduction as a function of a surface area of a cross section of the collectors 450. The x-axis of the graph 700 represents the area of the cross section of the collector 450 (FIG. 5), in centimeters squared. The y-axis represents of the graph 700 represents a relative difference in the reduction of the leakage field. The area of the cross section represents a surface area (in centimeters) of the cross section of the collector 450. The relative difference in reduction of the leakage field shown along the y-axis of the graph 700 corresponds to the reduction of the leakage field with the collector 450 as compared to the reduction of the leakage field without the collector 450. The values and curves shown in graph 700 are examples of the percentage of reduction of the leakage field at various distances between the collectors 450 and the transmitter 404. These examples are generally for purposes of illustration and are not meant to be limiting.

The graph 700 depicts a relationship of reduction of the leakage field by the collector 450 having specified cross sections. For example, when the area of the cross section of the collector 450 is 0.2 cm (representing a surface area of the cross section having dimensions 2 mm×10 mm), the collector 450 reduces the leakage field by approximately 4% as compared to when there is no collector 450. When the area of the cross section of the collector is 2 cm (representing a surface area of the cross section having dimensions 10 mm×20 mm), the collector 450 reduces the leakage field by approximately 43% as compared to when there is no collector 450. As shown in graph 700 and in the data of Table 1 below, the percentage difference in the leakage field of the collector 450 begins to plateau even as the area of the cross section of the collector 450 continues to increase. For example, the increase in the percentage difference in the leakage field of the collector 450 from an increase in the area of the cross section from 0.5 cm (representing a surface area of the cross section having dimensions 5 mm×10 mm) to 1.0 cm (representing a surface area of the cross section having dimensions 10 mm×10 mm) increases from approximately 15% to approximately 30%. However, the increase in the percentage difference in the leakage field of the collector 450 from an increase in relative volume from 2.0 cm (area having dimensions 10 mm×20 mm) to 4.0 cm (area having dimensions 10 mm×40 mm) increases from approximately 43% to approximately 59%. Accordingly, while the area of the cross section of the collector 450 doubles from 0.5 cm to 1.0 cm, the reduction of the leakage field also doubles. However, while the area of the cross section of the collector 450 doubles from 2.0 cm to 4.0 cm, the reduction of the leakage fields increases by only 33%. Thus, the reduction by the area of the cross section of the collector 450 has of the leakage field reduces as the area of the cross section of the collector 450 increases once the area of the cross section passes a specified point, thus defining a point at which a ratio between the reduction of the leakage field and the area of the cross section of the leakage collector becomes negligible.

Thus, the graph 700 indicates that as the area of the cross section of the collector 450 is increased, there is an area of the cross section above which the reduction of the leakage field is saturated. Accordingly, there may be an area of cross section of the collector 450 at which increasing the area of the cross section is not beneficial or cost effective in relation to the reduction of the leakage field.

Figure 7B:
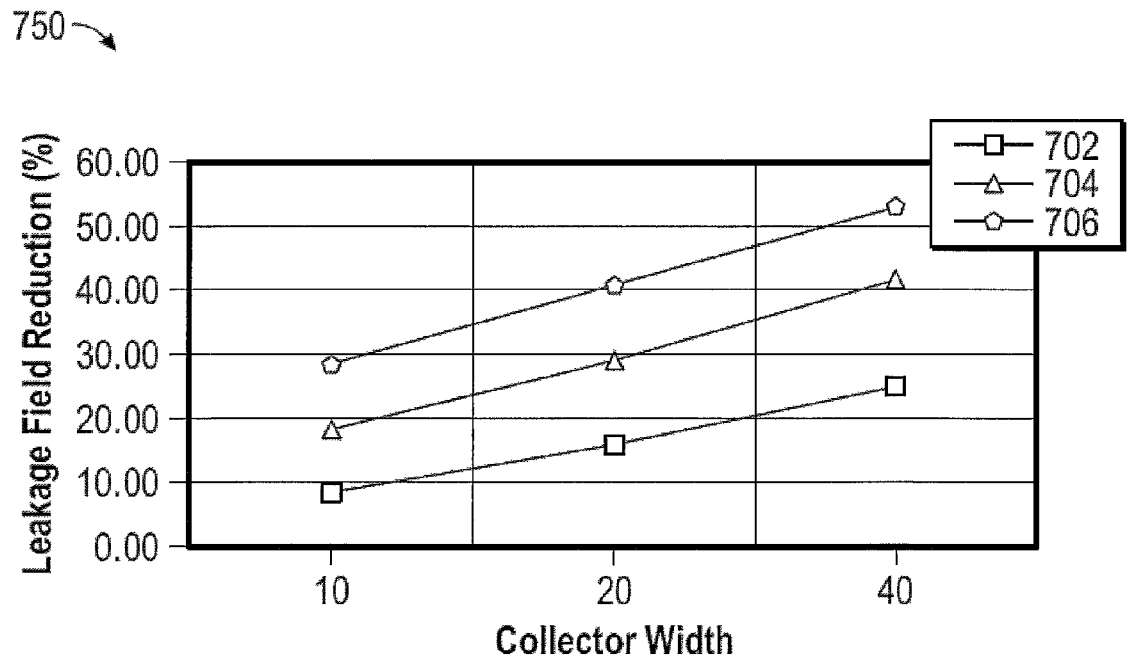
FIG. 7B shows a graph of the leakage field reduction as a function of collector width for various collector thicknesses.

FIG. 7B shows a graph 750 of the leakage field reduction as a function of collector width for various collector thicknesses. The x-axis of the graph 750 represents the collector width (in millimeters). The y-axis represents of the graph 750 represents a relative difference in reduction of the leakage field. The collector 450 width represents a first dimension of the cross section of the collector 450. The relative difference in reduction of the leakage field shown along the y-axis of the graph 750 corresponds to the reduction of the leakage field with the collector 450 as compared to the reduction of the leakage field without the collector 450. The values and curves shown in graph 750 are examples of the percentage of reduction of the leakage field at various distances between the collectors 450 and the transmitter 404. These examples are generally for purposes of illustration and are not meant to be limiting.

The graph 750 charts three (3) lengths (lines 702-706) corresponding to a collector length (in millimeters), the collector length being a second dimension of the cross section of the collector 450. Given the collector length (lines 702-706) and the collector width (x-axis), the graph 750 indicates the reduction of the leakage field of various collector widths given the collector lengths of lines 702-704. For example, each line 702-706 indicates a different collector cross section length 2 mm, 5 mm, and 10 mm, respectively. Accordingly, the line 702 indicates that a collector 450 having a cross section length of 2 mm and a collector cross section width of 10 mm will reduce the leakage field by approximately 9% as compared to no collector 450. Table 1 below provides the thickness, width, volume, and cross section area of the collectors 450 along with the reduction of the leakage field data indicated on graphs 700 and 750 of FIGS. 7A and 7B. As seen from the data in the Table 1 below, the percentage reduction of the leakage field per unit volume decreases as the volume increases beyond a cross section surface area of 2 cm. Additionally, ratio of collector width to thickness is less important than the total cross section area of the collector 450.

TABLE 1

| Thick (mm) | Width (mm) | Volume (m³) | Cross Section Area | Reduction of the leakage field (%) |
| --- | --- | --- | --- | --- |
| 2 | 10 | .0744 | .2 | 8.44 |
| 5 | 10 | .1860 | .49 | 18.28 |
| 10 | 10 | .3720 | .99 | 28.57 |
| 2 | 20 | .1504 | .4 | 15.84 |
| 5 | 20 | .3760 | 1 | 28.75 |
| 10 | 20 | .7520 | 2 | 40.7 |
| 2 | 40 | .3072 | .82 | 24.90 |
| 5 | 40 | .7680 | 2.04 | 41.23 |
| 10 | 40 | 1.5360 | 4.09 | 52.76 |

FIG. 8A-FIG. 8I show topographical views of the ground 475 having the transmitter 404 and the collector in relation to a front of the electric vehicle 405. As shown in FIG.

Figure 8A:
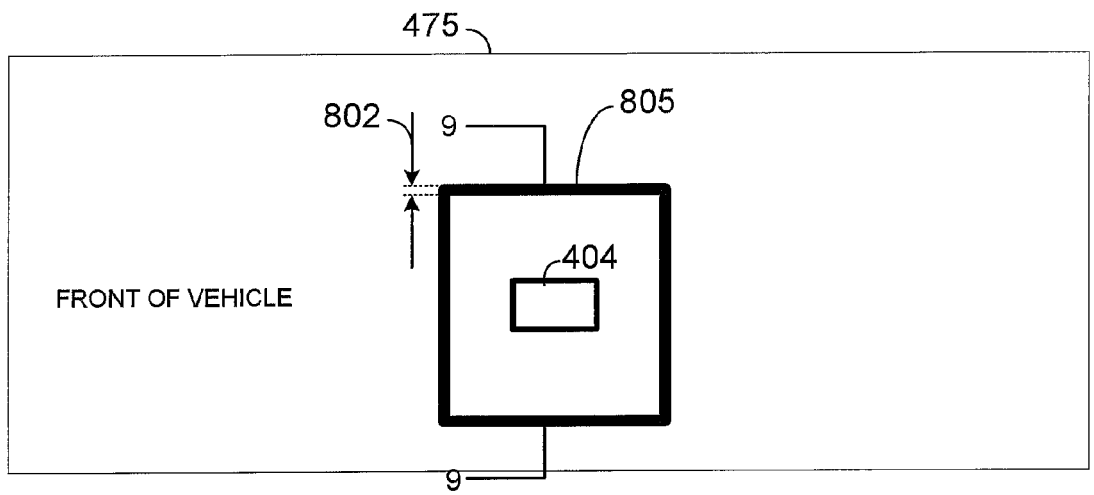
FIG. 8A-FIG. 8I show topographical views of the ground having the transmitter and the collector in relation to a front of the electric vehicle.
Figure 8B:
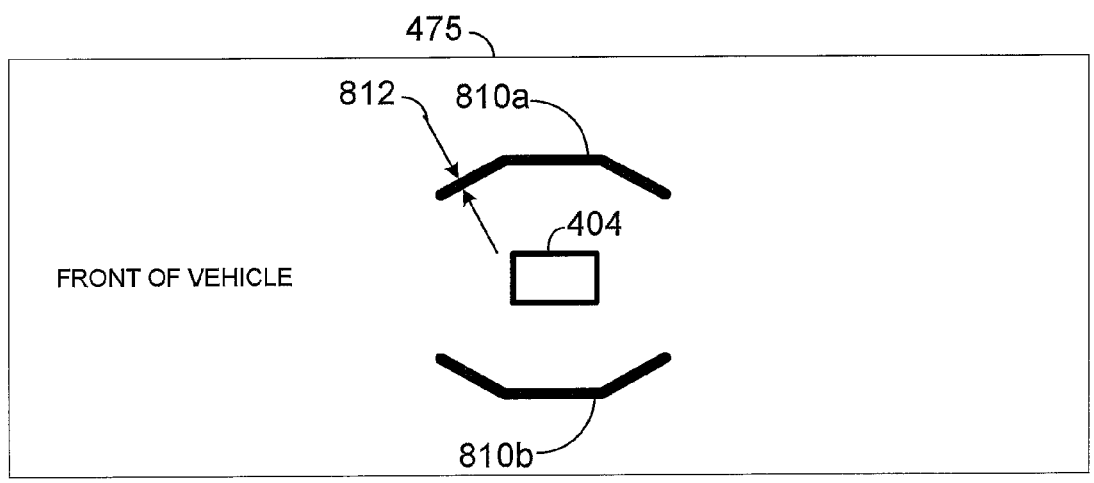
Figure 8C:
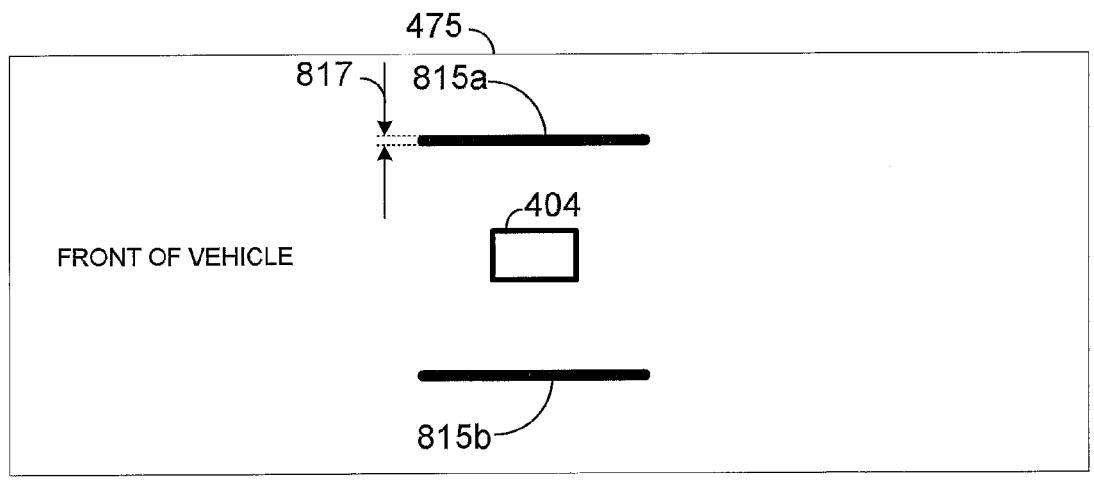
Figure 8D:
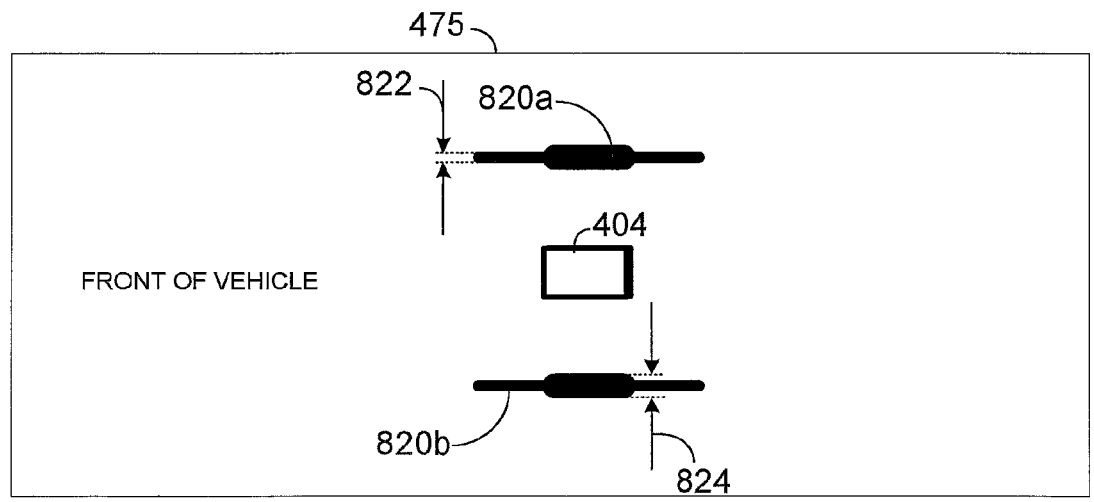
Figure 8E:
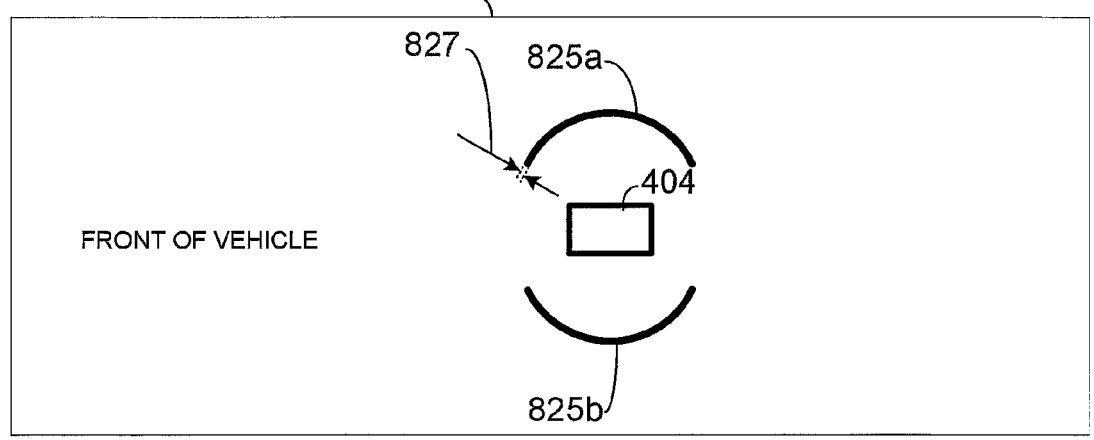
Figure 8F:
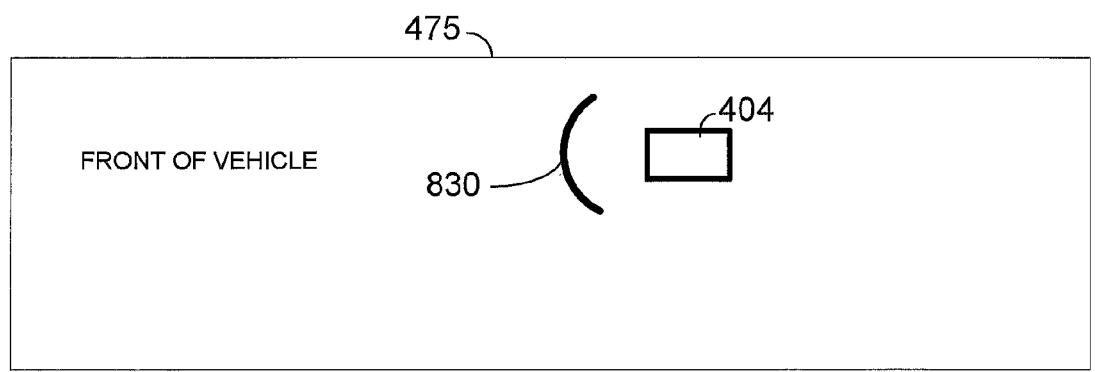
Figure 8G:
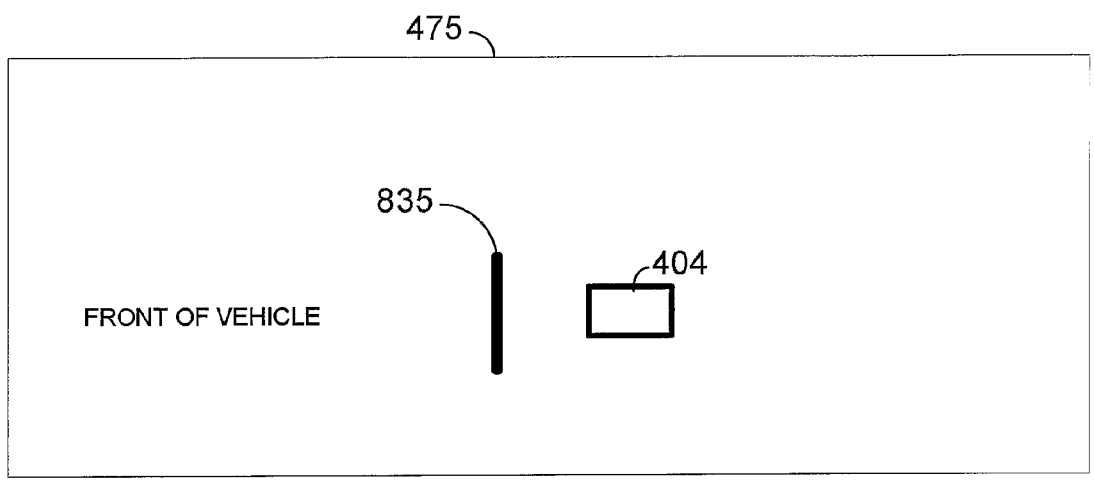
Figure 8H:
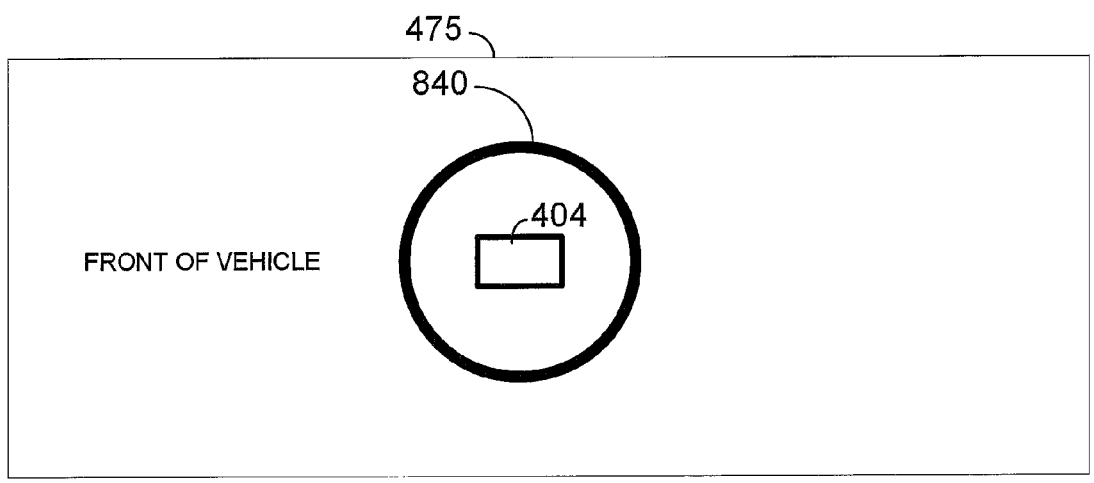
Figure 8I:
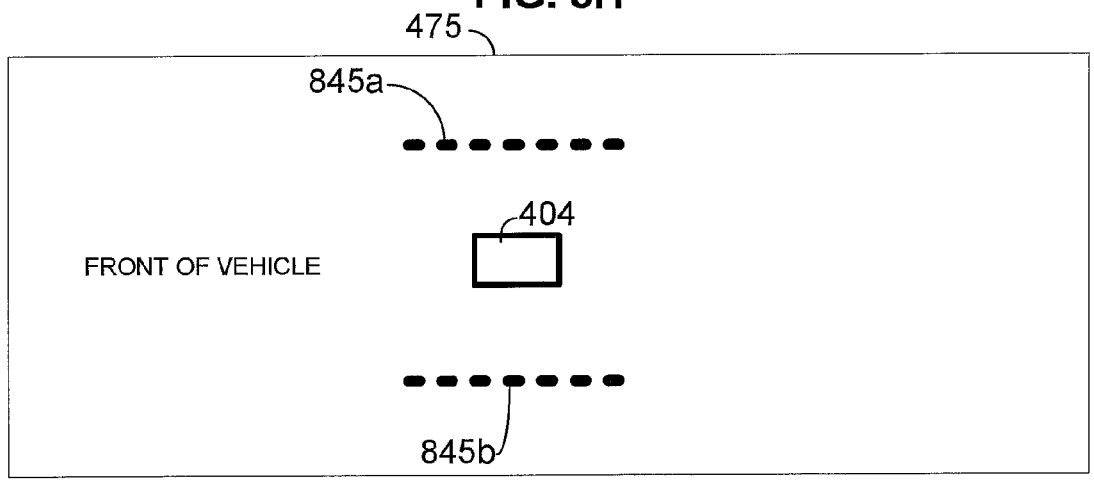

8A-FIG. 8I, the transmitter 404 is shown in proximity to collectors similar to the collector 450 (FIG. 4). Collectors 450 may be positioned a distance away from the transmitter 404, as described above, but still within the wireless charging field 416 (FIG. 4) generated by the transmitter 404. Such a distance may vary from a few inches to distances that may place the collectors 450 outside a perimeter of the electric vehicle 405. For example, the collectors described in connection with FIG. 8A-FIG. 8I may be placed at a position that is half a meter from the transmitter 404 in the direction of the length of the electric vehicle 405. In some implementations, the distance between the transmitter 404 and the collectors 450 may not be uniform around the transmitter 404. Furthermore, various geometries, shapes (e.g., a line, a square, a rectangle, a circle, a triangle, a polygon, or a semicircle), and other characteristics of the collectors 450 are shown in FIG. 8A-FIG. 8I. Different aspects of the designs disclosed below may be mixed and matched to suit different applications to efficiently influence or absorb the leakage fields 412 (FIG. 4).

Electric vehicles 405 (FIG. 4) may have various physical dimensions and construction. Thus the electric vehicles 405 may have varying characteristics related to the leakage field 412 (FIG. 4). Accordingly, selection, construction, or placement of the collectors 450 may consider a wide variety of physical characteristics of both the electric vehicle 405 and the collectors 450. In at least one implementation, the collectors 450 may be selected or formed based on a specific leakage field 412 type and strength. The selection of the collectors 450 may therefore consider that certain leakage fields 412 may have stronger or different flux patterns than others or have irregular flux patterns. In some implementations, the selection of collectors 450 may further consider the presence of people in a vicinity of the electric vehicle 405. The selection of the collectors 450 may include the ability of the collectors to form or shape the leakage field 412 as needed.

The collectors 450 may further be placed in a position (in relation to the transmitter 404) that most effectively takes advantage of the selected shape and/or composition of the collectors 450. Different collector 450 shapes may have different effects on leakage field distributions. Accordingly, different shapes of the collectors 450 may have different positions in relation to the transmitter 404. Additionally, or alternatively, a type of coil (e.g., polarized vs. non-polarized) used within the transmitter 404 may have different magnetic field distributions (and, accordingly, different flux distributions), thus utilizing collectors 450 of different shapes, positions, and/or compositions.

In some implementations, the collectors 450 may be disposed a specific distance from the transmitter 404, providing free space between the transmitter 404 and the collectors 450. The collectors 450 may exist above, below, or at the same height as the transmitter 404. Vertical positioning of the collectors 450 in relation to the transmitter 404 and the housing 402 may influence an optimal distance between the transmitter 404 and the collectors 450. In some implementations, the collectors 450 may be positioned as high as possible between the transmitter 404 and the housing 402 to guide the leakage flux to the housing 402 or reduce the leakage flux The collectors 450 may further be placed at the front, rear, or the sides of the electric vehicle 405 as the electric vehicle 405 is positioned over the transmitter 404 for charging. The orientation of the collectors 450 may further be considered. Certain leakage field 412 flux patterns may react differently to collectors 450 positioned in parallel to the lines of flux versus collectors 450 placed orthogonal to the lines of flux. Additionally, the mounting position of the collectors 450 in relation to the transmitter 404 and the housing 402 may impact the leakage field 412 reduction of the collectors 450. Additionally, dimensions or compositions of the vehicle shield 406 or the electric vehicle 405 or the positioning of the housing 402 may impact the leakage field 412 and thus impact the leakage field reduction by the collectors 450.

The collectors 450 may further be selected in varying quantities. For example, a segmented collector 450 (see the collectors 845a, 845b of FIG. 8I) may take advantage of the multiple smaller segments to shape the leakage field 412. The smaller segments of such an implementation may also reduce the volume of material used in the collectors 450. Additionally, the collectors 450 may selectively reduce the leakage field 412 based on their locations and positioning. For example, particular sides of the transmitter 404 (corresponding to particular sides of the collectors 450 and the electric vehicle 405) may include additional collectors 450 when that side should have a reduced leakage field 412.

FIG. 8A shows a topographical view of the ground 475 fitted with a collector 805 (similar to the collector 450 of FIG. 4, as noted above) and the transmitter 404, in accordance with an implementation. FIG. 8A shows the front of the electric vehicle 405 is to the left of the page of the FIG. 8A. The collector 805 may have a uniform thickness 802 around its perimeter. The collector 805 may have a rectangular shape of ferromagnetic (or similar) material and may be positioned to surround the transmitter 404 in the plane of the surface of the ground 475, leaving a large central aperture through which a wireless field such as the wireless charging field 416, can flow. In an implementation, the collector 805 may have dimensions slightly larger than the transmitter 404 but smaller than the vehicle shield 406 of the electric vehicle 405.

FIG. 8B shows a topographical view of the ground 475 fitted with collectors 810a and 810b (collectively collector 810) (similar to the collector 450 of FIG. 4, as noted above) and the transmitter 404, in accordance with an implementation. FIG. 8B shows the pair of collectors 810a and 810b disposed on or within the surface of the ground 475. The collectors 810a and 810b may be positioned in an area over which the electric vehicle 405 will be positioned when charging. In an implementation, the collectors 810a, 810b may each comprise two separate angled segments of ferromagnetic (or similar) material disposed on opposite sides of the transmitter 404. The collectors 810a, 810b may further substantially surround the transmitter 404. As shown, each of the collectors 810a, 810b each may have three portions. The center portion of each of the collectors 810a, 810b may be generally parallel with the longitudinal axis of the transmitter 404 along the length of the electric vehicle 405. The other two segments of each of the collectors 810 are angled toward the transmitter 404, forming a crude "C" shape facing the transmitter 404. In an implementation, the collectors 810a, 810b may have a constant width 812 along their length. In another implementation, the width 812 may not be constant along the entire length of the collectors 810.

FIG. 8C shows a topographical view of the ground 475 fitted with collectors 815a and 815b (collectively collectors 815) (similar to the collector 450 of FIG. 4, as noted above) and the transmitter 404, in accordance with an implementation. FIG. 8C shows the pair of leakage collectors 815a and 815b disposed on or within the surface of the ground or mounted above the surface of the ground. The leakage collectors 815a, 815b may comprise two parallel lengths of ferromagnetic (or similar) material disposed on or within the surface of the ground 475 over which the electric vehicle 405 will be positioned when charging. The collectors 815a, 815b may be positioned on opposing sides of the transmitter 404 running parallel with the length of the electric vehicle 405 (as shown) or perpendicular to the length of the electric vehicle 405 (not shown). The collectors 815a, 815b may further have a width 817, similar to the previous implementations. The width 817 as shown is constant along the length of the collectors 815, but may be varied along the length of the collectors 815a, 815b. In an implementation, one or more portions or segments of the leakage collectors 815a, 815b may be at different depths within the ground 475 or may protrude from the ground 475.

FIG. 8D shows a topographical view of the ground 475 fitted with collectors 820a and 820b (collectively collectors 820) (similar to the collector 450 of FIG. 4, as noted above) and the transmitter 404, in accordance with an implementation. FIG. 8D shows a pair of collectors 820a, 820b disposed in proximity to the transmitter 404. The leakage collectors 820a, 820b may comprise two parallel lengths of ferromagnetic (or similar) material disposed on, within, or above the surface of the ground 475 over which the electric vehicle 405 will be positioned when charging. The collectors 820a, 820b may be positioned on opposing sides of the transmitter 404 running parallel with the length of the electric vehicle 405 (as shown) or perpendicular to the length of the electric vehicle 405 (not shown). The collectors 820a, 820b may be configured with a width that varies from a first width 822 to a second width 824. In another implementation, the first width 822 may be narrower than the second width 824. As shown, the collectors 820a, 820b may vary in width from the first width 822 at opposite ends to a wider second width 824 at the middle. In another implementation, the opposite configuration may be present, having a narrow width at the middle and a wider width at the ends (not shown). In some implementations, the each collector 820a and 820b of the pair of collectors 820a, 820b may be of different varying thicknesses from each other. For example, collector 820a may have a first thickness 822 of 5 mm and a second thickness 824 of 10 mm while collector 820b may have a first thickness 822 of 20 mm and a second thickness of 15 mm.

FIG. 8E shows a topographical view of the ground 475 fitted with collectors 825a and 825b (collectively collectors 825) (similar to the collector 450 of FIG. 4, as noted above) and the transmitter 404, in accordance with an implementation. FIG. 8E shows a pair of collectors 825a, 825b disposed in proximity to the transmitter 404. The collectors 825a, 825b may comprise a number of curved, C-shaped portions of ferromagnetic (or similar) material disposed on, within, or above the surface of the ground 475 over which the electric vehicle 405 will be positioned when charging. The C-shaped portions may be positioned on opposing sides and facing the transmitter 404 in a concave manner. The collectors 825a, 825b may run parallel with the length of the electric vehicle 405 (as shown) or perpendicular to the length of the electric vehicle 405 (not shown). As shown, the collectors 825a, 825b may have a width 827 along the entire length. In another implementation, the width 827 may also vary along the length of the collectors 825a, 825b, similar to FIG. 8D. The C-shaped collectors 825 may flank either side of the transmitter 404 as shown or be disposed in another geometry around the transmitter 404 as needed for optimum leakage field absorption.

FIG. 8F shows a topographical view of the ground 475 fitted with a collector 830 (similar to the collector 450 of FIG. 4, as noted above) and the transmitter 404, in accordance with an implementation. FIG. 8F shows a leakage field collector 830 disposed in proximity to the transmitter 404. The collector 830 may comprise at least one curved, C-shaped portion of ferromagnetic (or similar) material. The collector 830 may be disposed on or within the surface of the ground 475 over which the electric vehicle 405 will be positioned when charging. The collector 830 may be positioned facing the transmitter 404 in a concave manner. The collector 830 may run perpendicular to the length of the electric vehicle 405 (as shown) or parallel with the length of the electric vehicle 405 (not shown). In some implementations, the collector 830 may be disposed between the transmitter 404 and an area of the ground 475 where a person may stand or travel, such as a crosswalk or pedestrian walkway (not shown). Accordingly, the collector 830 may be positioned to most efficiently influence or absorb leakage field 412 from the transmitter 404.

FIG. 8G shows a topographical view of the ground 475 fitted with a collector 835 (similar to the collector 450 of FIG. 4, as noted above) and the transmitter 404, in accordance with an implementation. FIG. 8G shows a collector 835 disposed in proximity to the transmitter 404. The collector 835 is positioned similar to collector 830 of FIG. 8F. The collector 835 may be disposed on or within the surface of the ground 475 over which the electric vehicle 405 will be positioned when charging. The collector 835 may comprise at least one segment or a bar as shown. The collector 835 may have a uniform thickness along its length as in previous implementations; however the collector 835 may also have a varying thickness. As described with FIG. 8F, the collector 835 may be disposed between the transmitter 404 and an area of the ground 475 where a person may stand or travel, such as a crosswalk or pedestrian walkway (not shown). In an implementation, the collector 835 may also be disposed to be positioned a front of the electric vehicle 405 to effectively influence or absorb leakage field 412 from the transmitter 404 in the direction of the crosswalk or pedestrian walkway.

FIG. 8H shows a topographical view of the ground 475 fitted with a collector 840 (similar to the collector 450 of FIG. 4, as noted above) and the transmitter 404, in accordance with an implementation. FIG. 8H shows a continuous leakage field collector 840 disposed in proximity to the transmitter 404. The collector 840 may be disposed on or within the surface of the ground 475 over which the electric vehicle 405 will be positioned when charging. The collector 840 is configured to surround the transmitter 404. The collector 840 may have a substantially uniform width along its circumference. However, in some implementations, the width of the collector 840 may vary (not shown in this figure). In some implementations the collector 840 may further be segmented, similar to the collector 830 (FIG. 8E) or as shown below in FIG. 8I. As in previous implementations, the collector 840 may have larger dimensions' than the electric vehicle 405 but smaller dimensions than the vehicle shield 406 of the electric vehicle 405.

FIG. 8I shows a topographical view of the ground 475 fitted with collectors 845a and 845b (collectively collectors 845) (similar to the collector 450 of FIG. 4, as noted above) and the transmitter 404, in accordance with an implementation. FIG. 8I shows collectors 845a and 845b disposed in proximity to the transmitter 404. Such a configuration may be similar to FIG. 8F. The collectors 845a, 845b may comprise multiple segmented sections along the ground 475. As shown, two segmented collectors 845a, 845b are positioned on either side of the transmitter 404. While only two collectors 845a, 845b are show, additional implementations may provide additional collectors. In another implementation, the collectors 845 may be disposed on or within the surface of the ground 475 over which the electric vehicle 405 will be positioned when charging, redirecting or absorbing the leakage fields 412 emanating from the sides of the electric vehicle 405 when the electric vehicle 405 is positioned over the transmitter 404.

In some implementations, the leakage collectors 450 described herein may reduce leakage fields 412 in dynamic charging systems (systems that transmit power wirelessly while the electric vehicle 405 is moving). For example, the transmitter 404 and the housing 402 may wirelessly transmit power in the WEVC system 400 configured to transmit power wirelessly to moving electric vehicles 405 or in dynamic charging systems where the electric vehicles 405 are not in a single position for an extended period of time (for example, at an intersection). The dynamic charging systems may have leakage collectors 450 positioned to reduce leakage fields 412 in a direction of pedestrians, animal, or plants, etc. (for example, along a sidewalk or a crosswalk). Accordingly, the various shapes, dimensions, and orientations of the collectors 450 described above may provide for selective reduction of the leakage flux 412 in a desired direction or location in the dynamic charging systems.

FIG. 9A-FIG. 9D show cross sectional views of portions of the WEVC system used to transmit power wirelessly from the transmitter to the housing including the receiver along a bottom portion of an electric vehicle, according to certain implementations. As shown, only the bottom portion of a chassis of the electric vehicle 405 is present with the housing 402, the vehicle shield 406, the transmitter 404, the collector 450, and the ground 475. Other components of the electric vehicle 405, such as wheels and other accessories are omitted from FIG. 9A-FIG. 9D for simplicity.

Figure 9A:
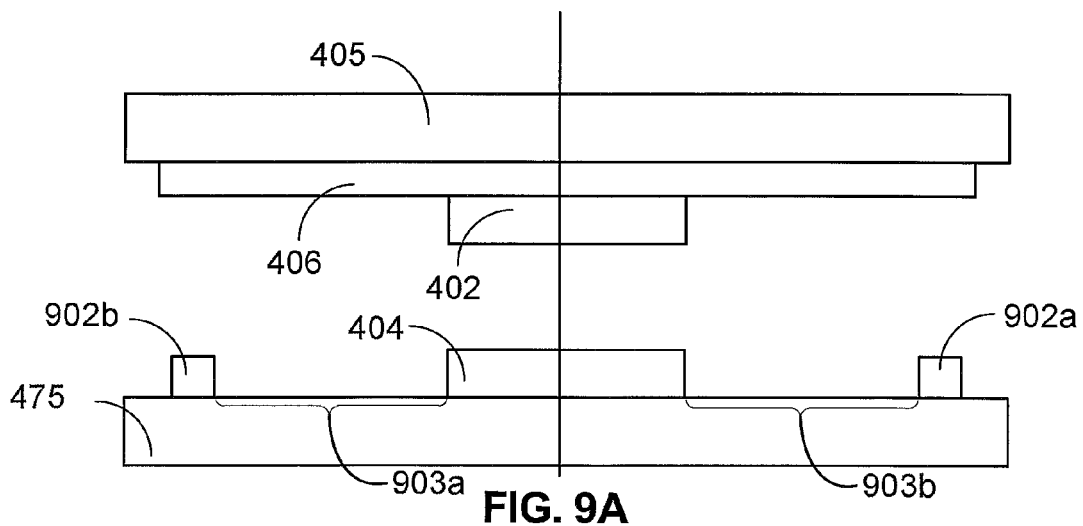
FIG. 9A-FIG. 9D show cross sectional views of portions of the WEVC system used to transmit power wirelessly from the transmitter to the housing including the receiver along a bottom portion of an electric vehicle, according to certain implementations.

FIG. 9A is a cross section view of portions of the WEVC system, according to an implementation. As shown, FIG. 9A shows a portion of the chassis of the electric vehicle 405 taken along the line 9-9 of FIG. 8A when the electric vehicle 405 is centered above the transmitter 404 and the collector 805. The chassis of the electric vehicle 405 may comprise the vehicle shield 406 disposed on or otherwise mounted to the bottom of the electric vehicle 405 chassis. As noted above in connection with FIG. 4, the vehicle shield 406 may comprise structural portions of the electric vehicle 405. Accordingly, the vehicle shield 406 may not be a separate component, but may be formed as a portion of the chassis of the electric vehicle 405. Thus, for purposes of this description, the vehicle shield 406 is detailed as a separate component for clarity and completeness.

The electric vehicle 405 may further comprise the housing 402 positioned on the bottom of the vehicle shield 406, as described above in reference to previous implementations (e.g., FIG. 1 and FIG. 4). The transmitter 404 may be shown as mounted on the ground 475 across from the housing 402. The collectors 902*a*, 902*b* (similar to the collector 450 of FIG. 4) are shown also mounted on the ground 475 a distances 903*a* and 903*b* (collectively distance 903) away from the right and left sides of the transmitter 404. In some implementations, the collectors 902*a*, 902*b* may be positioned such that the collector 902*a* or 902*b* is closer to one side of the transmitter 404 than another side of the transmitter 404.

In one implementation, the leakage collectors 902*a*, 902*b* may represent cross section views of individual segments of one or more of the collectors described above (e.g., the collectors 810*a*, 810*b*, 820*a*, 820*b*, 825*a*, 825*b*, 845*a*, 845*b*, etc.). In another implementation, the collectors 902*a*, 902*b* may be a cross sectional view of a continuous collector (e.g., the collectors 805, 840, etc.). Accordingly, the collectors 902*a*, 902*b* may show the shape of any of the leakage collectors described herein.

The collectors 902*a*, 902*b* are disposed on the ground 475. The collectors 902*a*, 902*b* may be mounted to, beside, or on the ground 475 according to a given design. In some implementations, the collectors 902*a*, 902*b* may be mounted to the transmitter 404 or beside, above, or below a plane in which the transmitter 404 is positioned. The collectors 902*a*, 902*b* of FIG. 9A have a rectangular cross section. In an implementation, the rectangular cross section of the collectors 902*a*, 902*b* may be integrated into one of the collector geometries of FIG. 8A-FIG. 8I. The same is true for the following examples.

Figure 9B:
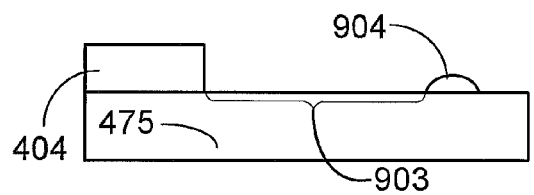
Figure 9C:
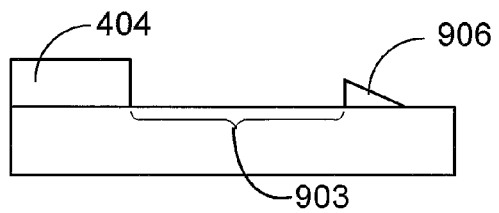
Figure 9D:
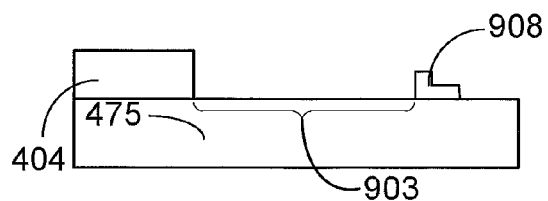

FIG. 9B is a view of a right hand side of the cross section view of a portion of the WEVC system, according to an implementation. FIG. 9B shows a cross section taken along the line 9-9 of FIG. 8A when the electric vehicle 405 is centered above the transmitter 404 and the collector 805. FIG. 9B-FIG. 9D each show only one side of the cross sectional view for simplicity. In an implementation, a collector 904 (FIG. 9B) having a rounded or semicircular cross section may be disposed on the ground 475 in proximity to the transmitter 404 and facing the electric vehicle 405. As in previous implementations, the collectors 904 may be disposed on, flush with, or below the surface of the ground 475. In some implementations, the collectors 904 may be mounted to the transmitter 404 or beside, above, or below a plane in which the transmitter 404 is positioned.

FIG. 9C is a view of a right hand side of the cross section view of a portion of the WEVC system, according to an implementation. FIG. 9C shows a cross section taken along the line 9-9 of FIG. 8A when the electric vehicle 405 is centered above the transmitter 404 and the collector 805. In an implementation, the collector 906 has a triangular cross section and may be disposed on the ground 475 in proximity to the transmitter 404. As in previous implementations, the collectors 906 may be disposed on, flush with, or below the surface of the ground 475. In some implementations, the collectors 906 may be mounted to the transmitter 404 or beside, above, or below a plane in which the transmitter 404 is positioned.

FIG. 9D is a view of a right hand side of the cross section view of a portion of the WEVC system, according to an implementation. FIG. 9D shows a cross section taken along the line 9-9 of FIG. 8A when the electric vehicle 405 is centered above the transmitter 404 and the collector 805. In an implementation, the collector 908 having an irregular, rectangular, or composite cross section may be disposed on the ground 475 in proximity to the transmitter 404. As in previous implementations, the collector 908 may be disposed on, flush with, or below the surface of the ground 475. In some implementations, the collector 908 may be mounted to the transmitter 404 or beside, above, or below a plane in which the transmitter 404 is positioned. The collector 908 is shown having an L-shaped cross section.

It is to be noted that geometry, position, and layout the planar views of the collectors 805, 810, 815, 820, 825, 830, 835, 840, and 845 may be combined in part or in whole with the various cross sections of collectors 902, 904, 906, 908. Certain implementations may include multiple types and geometries of the collectors disclosed herein. It should further be noted that implementations described above are not drawn to scale, thus any specific dimensions are not limiting.

Additionally, the implementation of various shapes, cross sections, and dimensions of collectors 350 (FIG. 3), 450 (FIG. 4), and those disclosed in FIG. 8A-FIG. 8I, may have differing effects on the reduction of the leakage fields. Additionally, the cross section of the collectors may impact the leakage field distribution. The collectors may have varying or irregular cross sections (see above, FIG. 9A-FIG. 9D) which may also affect the overall volume of the collectors. Accordingly, the cross section of the collectors may be selected to optimally adjust the absorption or influence on the leakage field 412.

Figure 10:
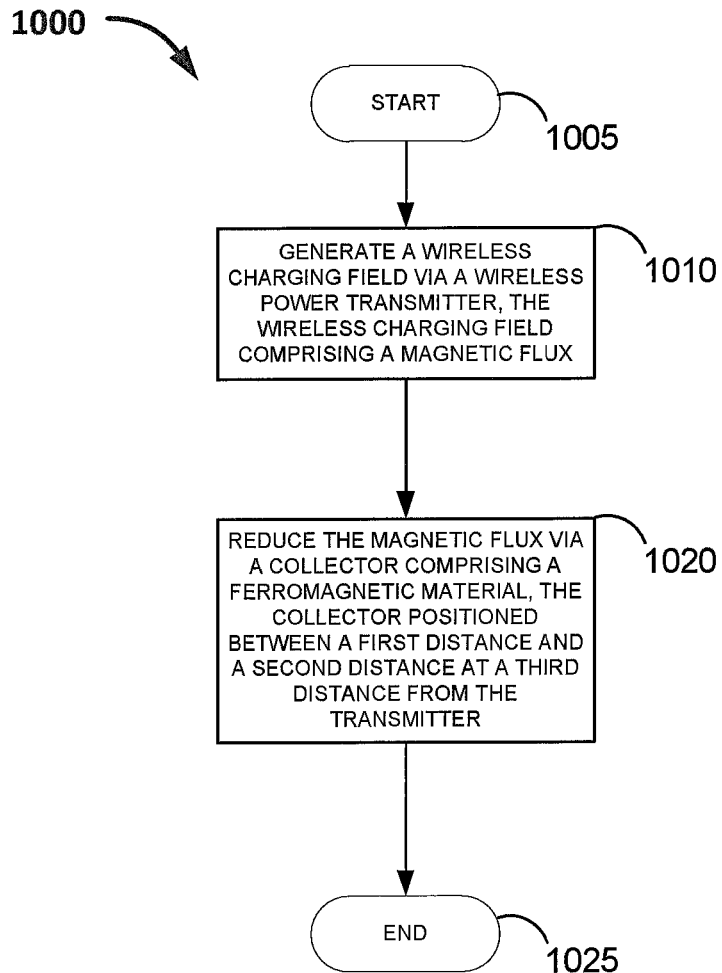
FIG. 10 is a flowchart showing a method of reducing magnetic flux of a wireless charging field in a wireless power charging system, according to an implementation.

FIG. 10 is a flowchart showing a method 1000 of reducing magnetic flux of a wireless charging field in a wireless power charging system 400 (FIG. 4), according to an implementation. At block 1005, the method 1000 begins. At block 1010, the method 1000 may generate the wireless charging field via a wireless power transmitter 404 (FIG. 4), the wireless charging field comprising the magnetic flux. The wireless power transmitter may correspond to the transmitter 404 (FIG. 4). The wireless charging fields may charge a vehicle positioned above the wireless power transmitter having a wireless power receiver configured to receiver power wirelessly. Once the method 1000 generates the wireless charging field, the method 1000 proceeds to block 1020. At block 1020, the method 1000 may reduce the magnetic flux via a collector comprising a ferromagnetic material. The collector may correspond to the collectors 450 (FIG. 4). The collector may be positioned between a first position and a second position at a third distance from the transmitter. The method 1000 may reduce the magnetic flux at a first level at the first distance, a second level at the second distance, and a third level at the third distance, the third level of magnetic flux reduction at the third distance greater than both the first and second levels of magnetic flux reduction at the corresponding first and second distances. Once the magnetic flux is reduced at a first level, the method 1000 proceeds to block 1025. At block 1025, the method 1000 ends.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions may not be interpreted as causing a departure from the scope of the implementations of the invention.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above may also be included within the scope of computer readable media. The processor and the storage medium may reside in an ASIC.

For purposes of summarizing the disclosure, certain aspects, advantages and novel features of the inventions have been described herein. It is to be understood that not necessarily all such advantages may be achieved in accordance with any particular implementation of the invention. Thus, the invention may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An apparatus for reducing leakage magnetic flux of a wireless charging field in a wireless power charging system, the apparatus comprising:

a wireless power transmitter having a transmitter edge and configured to generate the wireless charging field; and a collector having a collector edge and comprising a ferromagnetic material that reduces the leakage magnetic flux of the wireless charging field, the collector edge positioned at a distance $dist_x$ between the transmitter edge and the collector edge, wherein the collector provides a reduction of the leakage magnetic flux greater than about 26% when positioned at the distance $dist_x$ between the transmitter edge and the collector edge.

2. The apparatus of claim 1, wherein the collector is selected to have a first cross section that is less than or equal to a second cross section, wherein a first reduction of the magnetic flux is substantially the same at a third cross section that is greater than the second cross section as a second reduction of the magnetic flux at the second cross section.

3. The apparatus of claim 2, wherein the second cross section of the collector depends on at least one of a material of the collector, a location of the collector in relation to the transmitter, or a geometry of the collector.

4. The apparatus of claim 1, wherein the distance $dist_x$ between the transmitter edge and the collector edge are dependent on at least one of a material of the collector, a location of the collector in relation to the transmitter, or a geometry of the collector.

5. The apparatus of claim 1, wherein the reduction of the leakage magnetic flux depends on at least one of a material of the collector, a location of the collector in relation to the transmitter, a type of the transmitter, or a geometry of the collector.

6. The apparatus of claim 1, wherein the transmitter is disposed below a wireless power receiver and wherein the collector is disposed above the transmitter or below the transmitter.

7. The apparatus of claim 1, wherein the collector and the transmitter are disposed on the ground and wherein the collector surrounds the transmitter.

8. The apparatus of claim 1, wherein the transmitter and the collector are disposed on the ground above which a vehicle comprising a wireless power receiver configured to receive a charge via the field is positioned.

9. The apparatus of claim 8, wherein the collector is positioned around the transmitter at the distance $dist_x$ and reduces the magnetic flux beyond a perimeter of the vehicle.

10. The apparatus of claim 1, wherein the collector has a first perimeter greater than a second perimeter of the transmitter and wherein the collector at least partially surrounds the transmitter.

11. The apparatus of claim 1, wherein the collector is shaped in one of a square, a rectangle, a circle, a triangle, a polygon, or a semicircle, and wherein a perimeter of the collector extends away from a bottom of a vehicle comprising a wireless power receiver below the receiver.

12. The apparatus of claim 1, wherein the transmitter comprises a resonant circuit comprising a transmit coil configured to generate the field for coupling power to a receiver to charge an electric vehicle including the receiver.

13. The apparatus of claim 1, wherein the transmitter comprises another ferromagnetic material and wherein the collector is configured to reduce the magnetic flux at the distance $dist_x$ while the other ferromagnetic material is configured to guide, alter, shape, or enhance the wireless charging field regardless of the collector at the distance $dist_x$.

14. A method of reducing leakage magnetic flux of a wireless charging field in a wireless power charging system, the method comprising:
generating, via a wireless power transmitter having a transmitter edge, the wireless charging field; and
reducing the magnetic flux, via a collector having a collector edge and comprising a ferromagnetic material that reduces the leakage magnetic flux of the wireless charging field, the collector positioned at a distance $dist_x$ between the transmitter edge and the collector edge,
wherein the collector provides a reduction of the leakage magnetic flux greater than about 26% when positioned at the distance $dist_x$ between the transmitter edge and the collector edge.

15. The method of claim 14, wherein the collector has a first cross section that is less than or equal to a second cross section and wherein a first reduction of the magnetic flux is substantially the same at a third cross section greater than the second cross section as a second reduction of the magnetic flux at the second cross section.

16. The method of claim 15, wherein the second cross section of the collector depends on at least one of a material of the collector, a location of the collector in relation to the transmitter, or a geometry of the collector.

17. The method of claim 14, wherein the distance $dist_x$ between the transmitter edge and the collector edge are dependent on at least one of a material of the collector, a location of the collector in relation to the transmitter, or a geometry of the collector.

18. The method of claim 14, wherein the reduction of the leakage magnetic flux depends on at least one of a material of the collector, a location of the collector in relation to the transmitter, a type of the transmitter, or a geometry of the collector.

19. The method of claim 14, wherein the transmitter is disposed below a wireless power receiver and wherein the collector is disposed above the transmitter or below the transmitter.

20. The method of claim 14, wherein the collector and the transmitter are disposed on the ground and wherein the collector surrounds the transmitter.

21. The method of claim 14, wherein the transmitter and the collector are disposed on the ground above which a vehicle comprising a wireless power receiver configured to receive a charge via the field is positioned.

22. The method of claim 21, wherein the collector is positioned around the transmitter at the distance $dist_x$ and reduces the magnetic flux beyond a perimeter of the vehicle.

23. The method of claim 14, wherein the collector has a first perimeter greater than a second perimeter of the transmitter and wherein the collector at least partially surrounds the transmitter.

24. The method of claim 14, wherein the collector is shaped in one of a square, a rectangle, a circle, a triangle, a polygon, or a semicircle, and wherein a perimeter of the collector extends away from a bottom of a vehicle comprising a wireless power receiver below the receiver.

25. The method of claim 14, further comprising coupling power to a receiver of an electric vehicle via the generated magnetic flux.

26. The method of claim 14, further comprising guiding, altering, shaping, or enhancing the wireless charging field via another ferromagnetic material integrated with the transmitter regardless of the collector at the distance $dist_x$.

27. An apparatus for reducing leakage magnetic flux of a wireless charging field in a wireless power charging system, the apparatus comprising:
means for generating the wireless charging field; and
means for reducing the magnetic flux configured to reduce the leakage magnetic flux of the wireless charging field, the reducing means being positioned at a distance distx between the generating means and the reducing means, wherein the reducing means provides a reduction of the leakage magnetic flux greater than about 26% when positioned at the distance distx between the generating means the reducing means.

28. The apparatus of claim 27, wherein the generating means comprises a wireless power transmitter and wherein the reducing means comprises a collector comprising a ferromagnetic material that reduces the leakage magnetic flux of the wireless charging field.

29. The apparatus of claim 27, wherein the reducing means has a first cross section that is less than or equal to a second cross section and wherein a first reduction of the magnetic flux is substantially the same at a third cross section that is greater than the second cross section as a second reduction of the magnetic flux at the second cross section.

30. The apparatus of claim 27, wherein the reducing means is positioned around the generating means at the distance $dist_x$ and reduces the magnetic flux beyond a perimeter of a vehicle comprising a wireless power receiver for configured to receive a charge via the field.

31. The apparatus of claim 1, wherein a surface area of a cross section of the collector is equal to a value above which an increase of the surface area of the cross section does not result in a proportional increase in the reduction of the leakage magnetic flux.

* * * * *